INVENTOR
JACK F. BENE
BY R. P. Johnson
ATTORNEY

Aug. 16, 1966 J. F. BENE 3,267,258

MARK SCORING APPARATUS

Filed Dec. 23, 1963 8 Sheets-Sheet 3

Aug. 16, 1966 J. F. BENE 3,267,258

MARK SCORING APPARATUS

Filed Dec. 23, 1963 8 Sheets-Sheet 7

United States Patent Office 3,267,258

Patented August 16, 1966

3,267,258

MARK SCORING APPARATUS

Jack F. Bene, Rochester, Minn., assignor to International Business Machines Corporation, New York, N.Y., a corporation of New York Filed Dec. 23, 1963, Ser. No. 332,520
12 Claims. (Cl. 235—61.7)

This invention relates generally to machines for scoring examination or response documents and more particularly to apparatus for handling master and control information as required in order to score the response documents.

As is commonly known, many student examinations and public surveys are of the objective type in that each question requires the selection of one of several possible answers. The selected answer is then marked in one of the plurality of response positions provided for that question on the response document. When the answers to the questions have been completed the response document is then scored by comparing the location of marks thereon with the location of positions marked on a master document.

Because of the multitude of response documents resulting from the examinations and surveys, various machines have been developed in order to reduce the laborious task of manually comparing the response and master documents. These machines each includes some means of storing the master information so that it is cyclically available in synchronism with each response document fed through the machine. The storage means heretofore used have comprised mounting the punched or marked master document on a movable support and sensing the indicia thereon in synchronism with the passage of response positions on the response document, or organizing only particular ones of sensing circuits to be conductive when the response mark occurs at the proper position, or punching master tapes to be sensed simultaneously with the response document, or storing master information on a magnetic drum that is to be read off in synchronism with the sensing of response marks. These storage means have each proven helpful in reducing the task of scoring response documents.

There are, however, certain features on these machines which it is desirable to improve in order to provide a more reliable and less expensive mark scoring machine. For example, a separate carrier mechanism and sensing devices must be provided when master documents or tapes are sensed and the master document may eventually become worn from repeated sensing so that it must be replaced during scoring. Synchronously timed sensing of paper master documents is often undesirable because changes in the ambient humidity alters the dimensions of the document, thus causing difficulty in maintaining the required synchronism between master and response documents. Although magnetic drum storage of master information is relatively reliable, it is inherently expensive due to the cost of manufacturing the drum and driving mechanisms within close tolerances and the large number of magnetic recording and sensing devices required therewith. Although such storage permits rapid comparison in scoring of response documents, a highly precise document transport must be maintained because of the close synchronism required between the drum and response documents to avoid erroneous scoring.

The usual response document is divided into different parts and each part is scored separately by different formulas such as counting only the rights or wrongs, or subtracting the wrongs from the rights, or subtracting a portion of the wrongs from the rights. Because of this, the score is usually directed to different counters or transferred from one counter to another at the end of a part. To accomplish a change in scoring each part and provide appropriate counter accumulation, there must be suitable control signals produced during the sensing of the response document. This requires storage facilities for the control signals in addition to those for the master information.

An additional requirement in a scoring machine is that the master information in control data be capable of easy change before a different set of response documents is to be scored. In many of the test scoring machines currently available this entails the removal of the master document or tape and a new one inserted therefor appropriately marked for the next set of response documents to be scored.

Accordingly, it is a primary object of this invention to provide a scoring machine for response documents having improved master information storage apparatus that is more reliable and less expensive than that in known machines.

It is another object of this invention to provide master information storage apparatus for a scoring machine having improved flexibility for processing various document formats and being operable at increased speeds.

Another object of this invention is to provide improved scoring apparatus for marked response documents that permits greater timing tolerances between the moving response documents and the stored master information.

Another object of this invention is to provide storage apparatus for a response document scoring machine in which master information can be changed easily and rapidly.

Yet another object of this invention is to provide master information storage apparatus for a response mark scoring machine that requires the minimum of maintenance, is durable and silent in operation.

The objects of this invention are attained by providing apparatus which comprises means for sensing predetermined response positions in master, control and response documents as they are successively transported past transducers so as to produce output bit signals indicative of marked positions, then transferring the output signals in parallel to temporary or buffer storage means, from which master and control data bits are subsequently transferred in a predetermined arrangement as data words to a delay line in response to control means for continuous recirculation and storage as long as desired. Readout control means then determine the particular data words to be successively read from the delay line storage into readout storage means. The data bits in the buffer storage means, obtained from response documents word by word, are scored by means comparing these bits, word by word, with those in the readout storage means and generating count pulses which may be supplied to the accumulator. Means are also responsive to control bits on the delay line for designating the end of a test part or counter readout as required.

When the machine is in the operational mode for storing master and control information on the delay line, a "first entry" bit is written on the line arbitrarily designating the beginning of the delay line storage. Subsequently, by means of a particular machine timing signal, a "word mark" is recorded on the delay line to indicate the start of a word of bit data serially recorded in the master or control documents. The word mark is then advanced to a new position on the line so that bits from a new group of marked response positions can be recorded. Recording continues thusly until all master and control bits have been written word by word on the delay line. When recordation has been completed, the machine is switched to a scoring mode and the word mark is moved to a position adjacent the first entry mark indicating the first word. The delay line storage is serial and has a capacity sufficient to store all required data words before the stored bits are regenerated and recirculated. When the bits of a word on a response document have been sensed, the bits of a corresponding word are read from the delay line into the readout storage means and the word mark is moved to a succeeding word on the line. The bits in the buffer storage means and readout storage means are then compared.

Information is continuously recirculated on the delay line by regeneration circuits so that the bit order is never changed for a particular set of master and control sheets. Information can thus be cleared easily from the line by disabling the regeneration circuits. The bit circulation occurs many times between the sensing of successive words on a response document so that access time for a paritcular word is extremely short. This permits counters to read out and scores printed within a minimum of time because much of the data transfer required for these operations can occur during the time the response document is moving from one word to another. The capacity of the delay line is sufficient for the bits in the maximum length data word so that the number of response positions in a word and for a question can be decreased from the maximum over a wide range without impairing the scoring speed of a document, and thus each part of the document may have a varying number of response positions per question.

The foregoing and other objects, features and advantages of the invention will be apparent from the following more particular description of a preferred embodiment of the invention, as illustrated in the accompanying drawings in which.

Figure 3A:
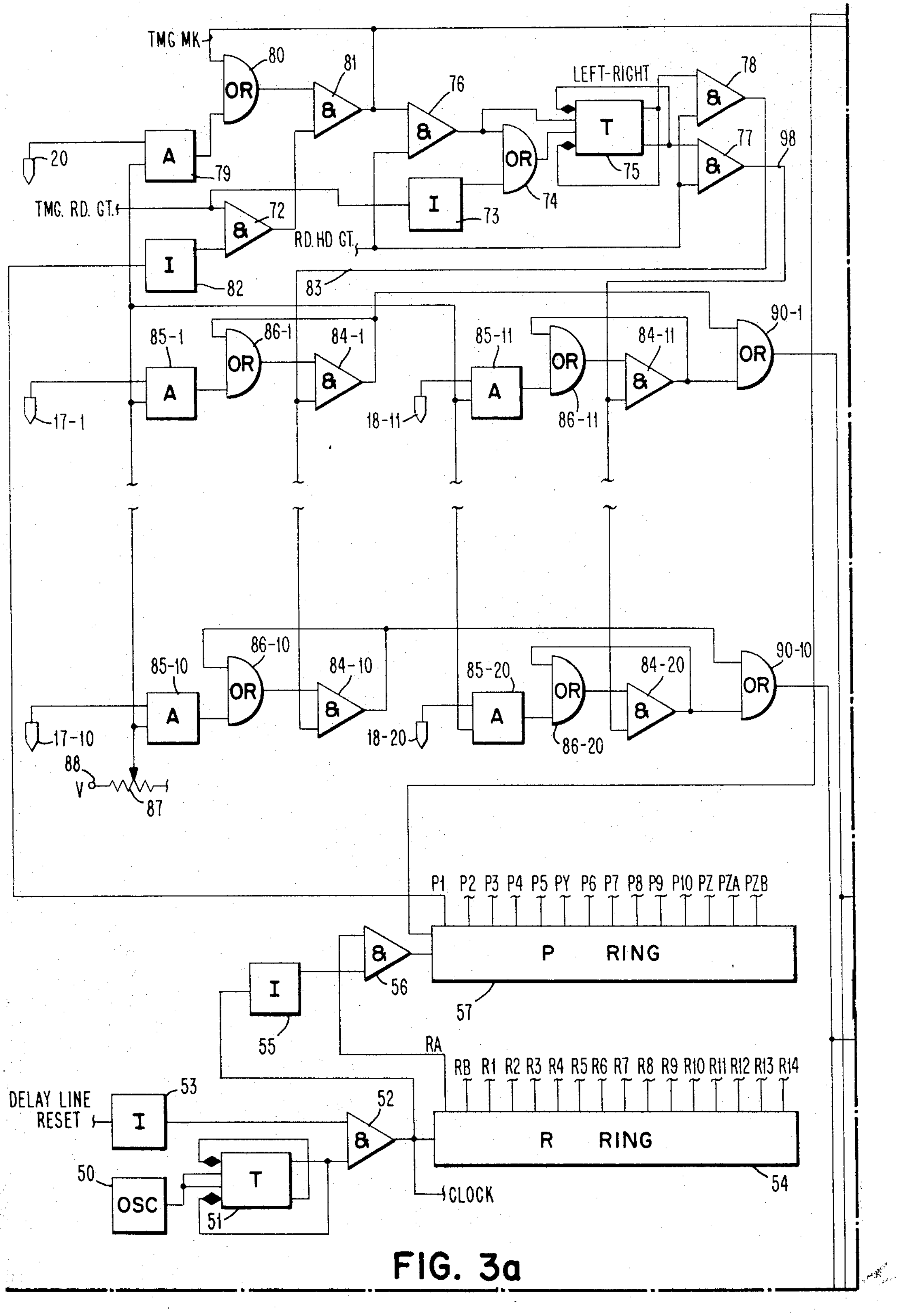
Figure 3B:
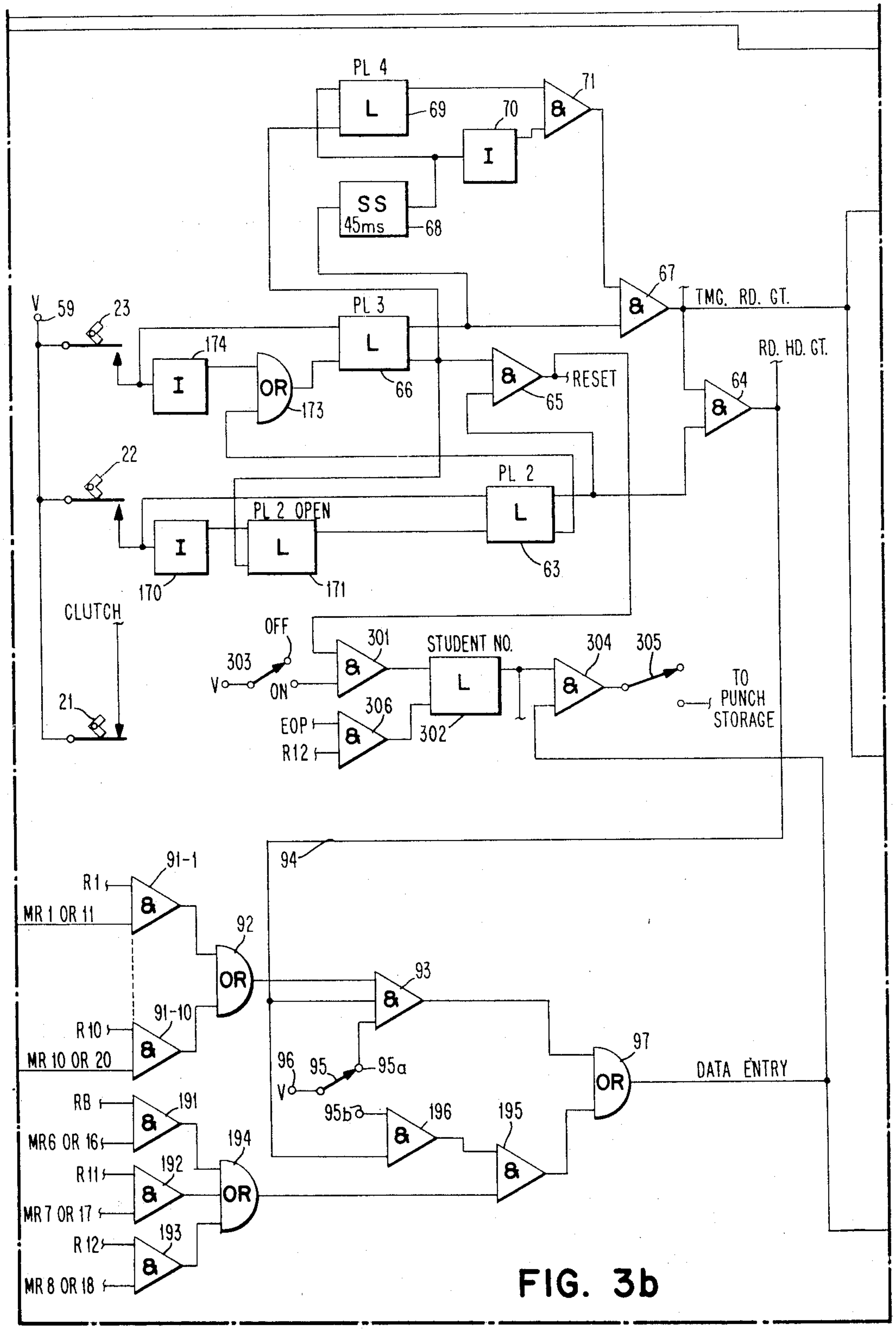
Figure 3C:
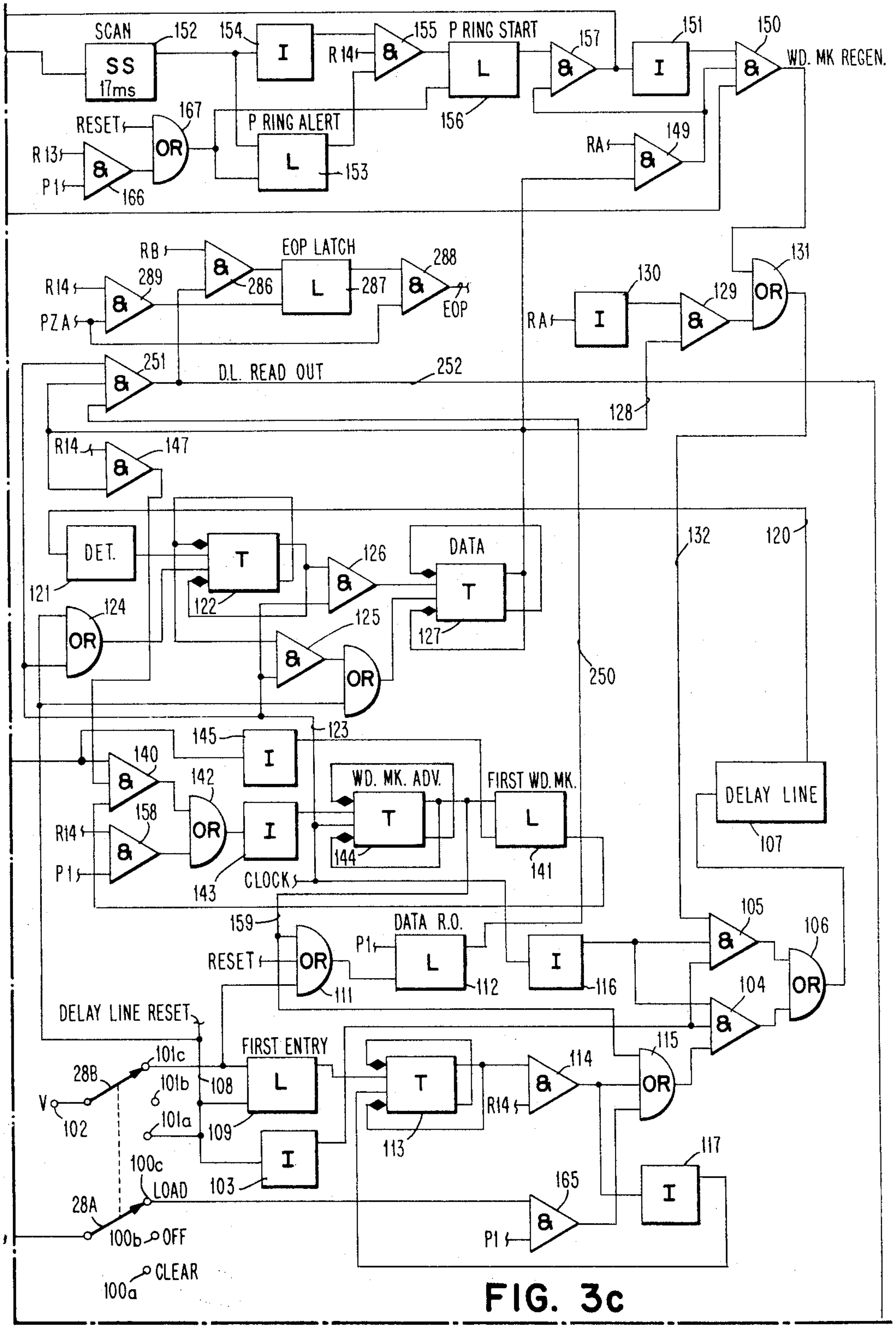
Figure 3D:
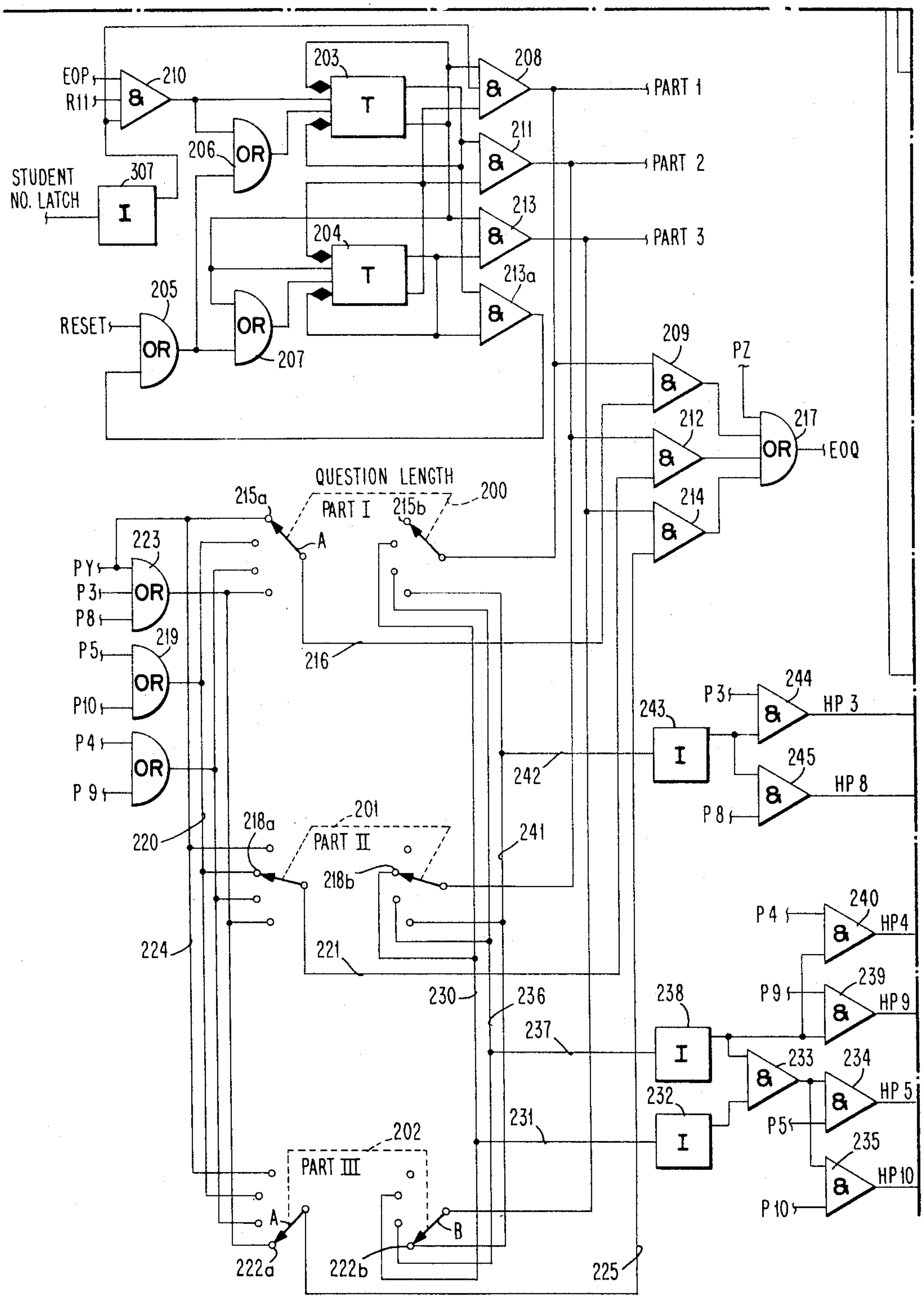
Figures 3E, 4:
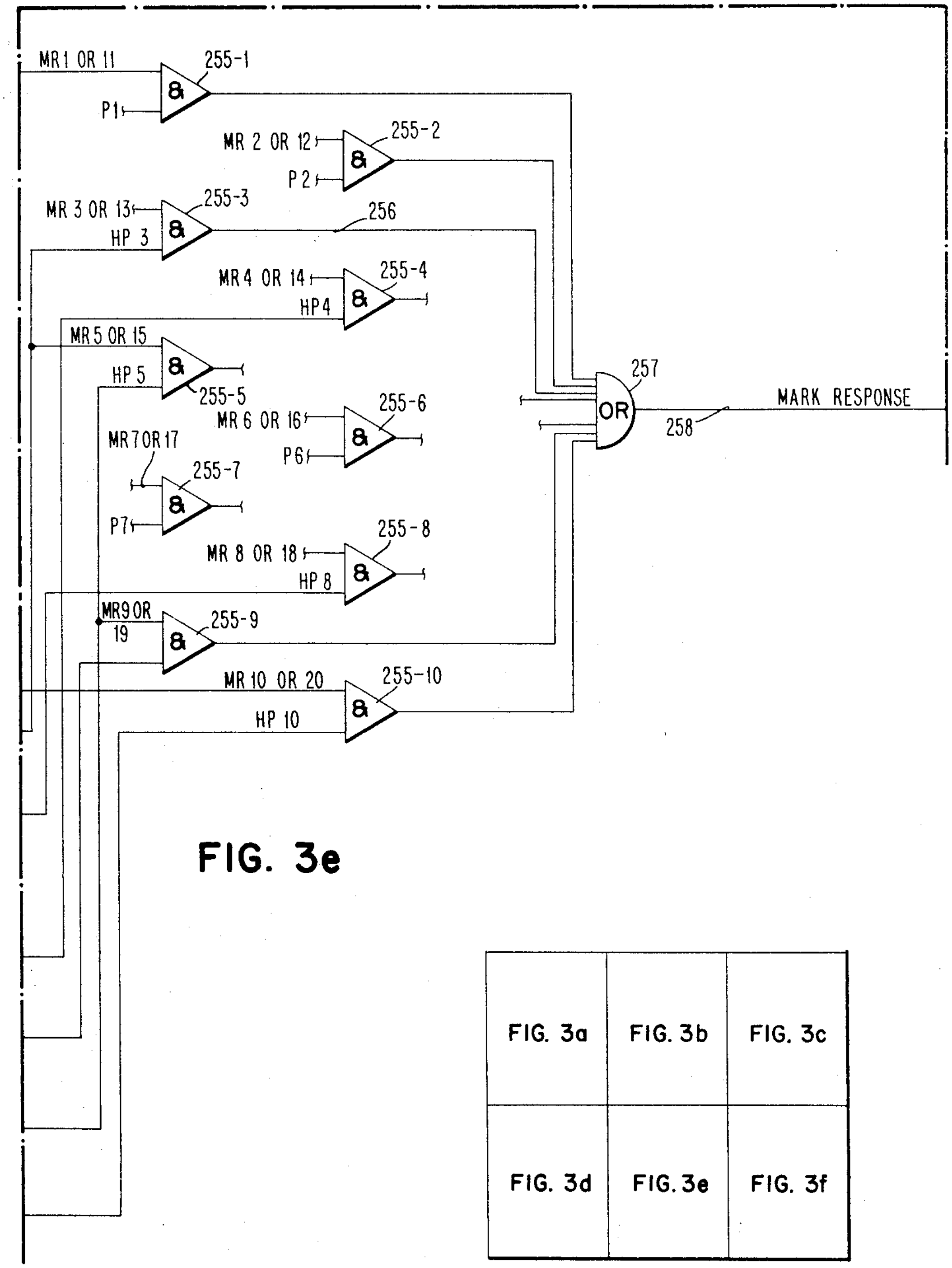

FIGURES 3*a* through 3*f* are detailed diagrams of the circuits used in the document scoring machine incorporating the invention;

FIGURE 4 shows the arrangement of FIGS. 3*a*–3*f*; and

Figure 5:
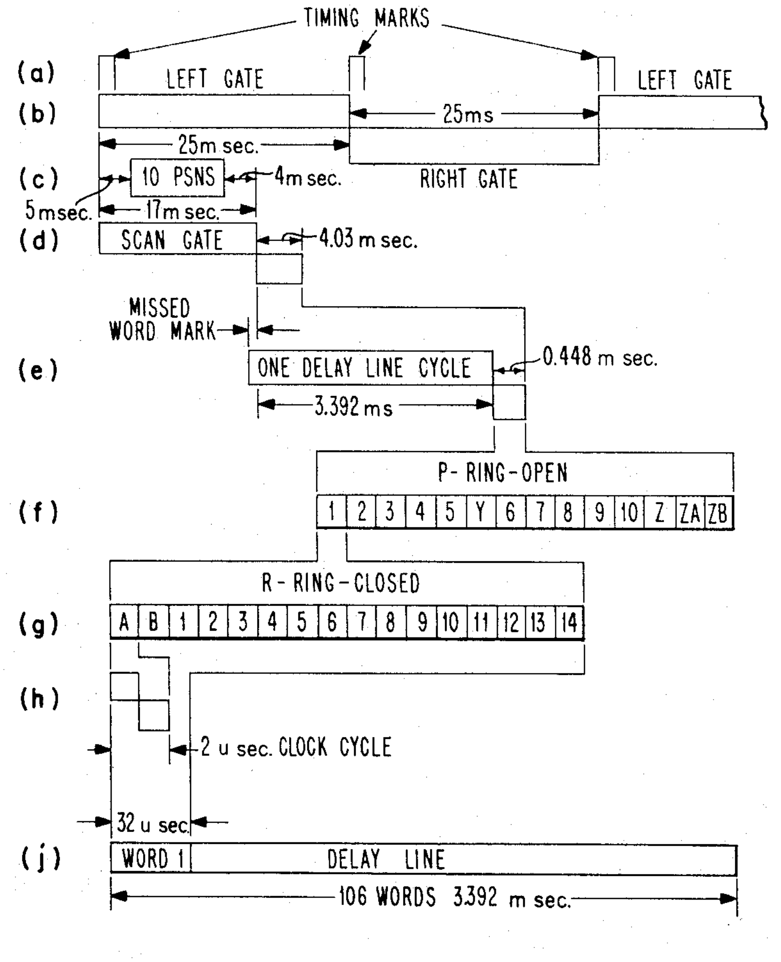

FIGURE 5 is a diagrammatic illustration of the time relationship of electrical signals occurring in the circuits of FIGS. 3*a*–3*f*.

RESPONSE DOCUMENT

Before proceeding with a description of the scoring machine circuits a brief description will be given of an example of a document format, illustrated in FIG. 1, which may be used for master, control and response data to be sensed by the machine. The response document 10 is an 8½ inch by 11 inch paper document which may contain a maximum of 1000 response positions, arranged in fifty horizontal rows of twenty response positions in each row. Each row is divided into two groups of ten response positions and each group is called a "word" for the purpose of defining an answer area. Thus the maximum of 100 words is provided for one side of a response document, which can be divided further into various combinations of scorable parts, such as Test 1, Test 2, etc., shown in the figure. Portions of the document may be reserved for other purposes such as an identification number, areas for computation, etc. Each part or test, however, has the same number of response positions per question. Each response position 11 is defined by a pair of dashed lines 12, indicating the areas in which a mark is to be entered. The marks may be made by either pen or pencil with the requirement only that the marks be of sufficient contrast relative to the document to be sensed by photoelectric transducers. The questions may be serially numbered and the response positions indicated for suitable indicia such as letters in order to indicate the areas in which the mark for a particular question is to be entered. Although each question shown in the illustrated response document has five response positions per question, this number may be two, three, four, etc. up to twenty response positions or one horizontal row.

At the right hand margin of the document is provided a column of timing marks 13 which serve to control the machine operation as will be subsequently described. A timing mark is provided for each word; thus two timing marks are used in sensing each horizontal row of response positions. The timing marks are sensed sequentially by a single photoelectric transducer as the document is fed through the scoring machine. The timing marks are printed in a color such as black which the transducer will recognize during processing and the mark for a row is located in advance of its row because of the sensing transducer location. All other preprinted marks such as the question numbers, letters, horizontal lines, etc. are printed in a color to which the transducers are insensitive. Although only one side of a response document has been illustrated, the reverse side may also be used for response marking and would be preprinted with the format desired, while still retaining the row and column configuration of response positions. Only one side of the response document, however, is scored at one time in the apparatus described below. The same format is used for the master, control and response data for sensing by the scoring machine, as will become evident.

GENERAL DESCRIPTION OF DATA SCORING

Figure 2:
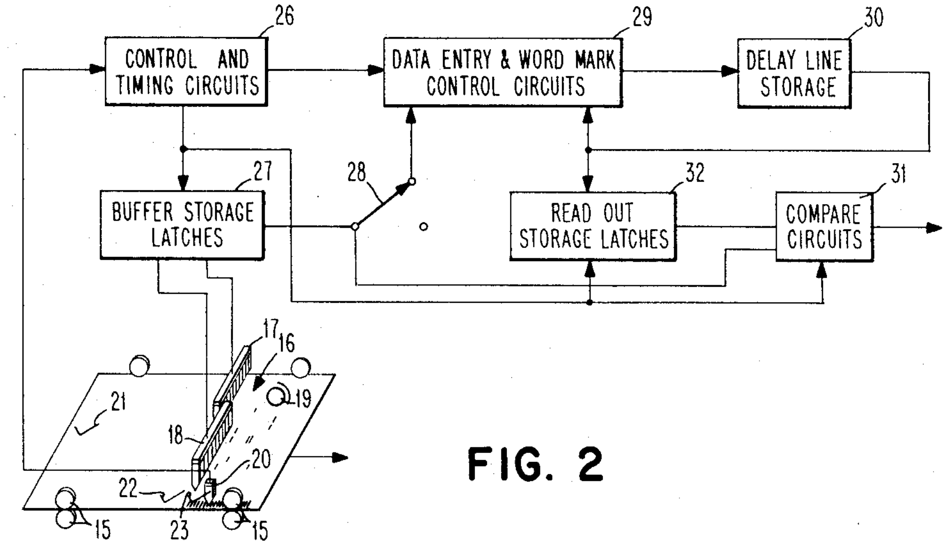
FIGURE 2 is a schematic diagram of the document sensing mechanism, and data storage and scoring apparatus of the invention.

With reference now to FIG. 2, there is shown schematically the manner in which master, control and response data is sensed, entered into storage and scored. The documents 10 are moved successively, top edge first in the direction of the arrow, in a suitable hopper (not shown) by well-known transport rollers 15 through a reading or sending station 16 comprising two pluralities or banks 17, 18 of photoelectric transducers and a suitable light source 19 so that each transducer scans a designated column of response or mark postions. A photoelectric transducer 20 is positioned to scan the timing marks along the document margin. Each transducer plurality or bank comprises 10 photoelectric cells, and the banks are offset one-half the row to row distance with respect to the other in the direction of document travel in order to reduce the number of circuits required as will be later described. As the document is moved through the sensing station in the proximity of the light source and transducers, it engages and closes successively paper levers 21, 22 and 23 which operates as resetting and conditioning signals for the machine circuits.

When the timing transducer 20 senses a timing mark, it serves to initiate operation of the Control and Timing circuits 26 which, along with paper levers 21–23, provide a gating signal to Buffer Storage Latches 27. Each transducer is provided with a latch and all latches are gated simultaneously to accept signals in parallel from all transducers in bank 17. After a fixed time has been provided for scanning the respective mark positions for one "word" and registering signals for marks encountered, the temporarily stored data is then transferred along either of two paths depending on whether master, control or response data is being read. In order to score the response data, the master and control data is entered in the machine memory for subsequent comparison and use with the response data. Considering document 10 as the first or master document, a switch 28 is in the position shown and the temporarily stored master data is transferred to Data Entry and Word Mark Control circuits 29 where it is entered in the Delay Line Storage 30 in serial order by the Control and Timing circuits 26. The stored data passes through the delay line and is continuously regenerated by the Data Entry and Word Mark Control circuits. At the time of entry on the delay line, a word mark pulse is entered at the beginning of the word of data to serve as identification of the last entered word.

As document 10 continues its movement, timing transducer 20 is energized again by the next timing mark. Another group of Buffer Storage Latches 27 are gated this time for the second bank of transducers 18 by Control and Timing circuits 26 so that the response marks on the right half of document 10 are stored. These marks or data bits are also transferred into the Delay Line Storage 30 via the Data Entry and Word Mark Control circuits 29 in the data word position following the first word. The word mark, however, is moved one word position further down the delay line prior to the second data entry to designate the position of storage for the second word. As master document 10 continues through sensing station 16 the transducer latches for each plurality of transducers are alternately gated so that the words of data are entered sequentially on the delay line. Regeneration and recirculation of the data words continues uninterruptedly with the exception of the word mark, until it is desired to remove the stored bits.

The control data is also entered on the delay line in the same manner as that from the master document. However, in this instance, a different document 10 is used, but having the same format as the document used for storing the master data, and certain designated ones of the mark response positions are marked to indicate the word with which a test part terminates or to indicate a readout or transfer of counter data. When control data is entered on the delay line, a switch (not shown in FIG. 2) is operated to permit the entry of the control data from Buffer Storage Latches 27 in reserved bit positions of the appropriate words already stored on the delay line. Provision is made in the machine timing to provide extra storage bits within each master data word for the storage of control data as desired. A more detailed description of the control data storage and its use will be given hereinbelow.

After storage of the master and control data on the delay line, switch 28 is moved to its alternate position preventing further entry of data into storage, and the machinne is thus placed in a scoring mode by which the response documents may be compared with the master data. A response document is fed through the reading station in the same manner as that for the master and control documents and the two pluralities for banks of transducers 17, 18 are again alternately gated by the control signal produced by timing transducer 20. However, in the scoring mode, the information or data word sensed by each bank of transducers is read out of Buffer Storage Latches 27 serially into compare circuits 31. It should be mentioned here that as each of the trailing edges of the master and control documents pass under paper lever 22 permitting it to open, the word mark on the delay line is erased. With the subsequent closing of paper lever 23 by the leading edge of the document a word mark is reinserted again at the first word. Upon sensing the first timing mark of the response document by transducer 20 the left bank of transducers 17 is again gated to enter information to the Buffer Storage Latches 27, and the Control and Timing circuits 26 provide a signal to gate Readout Storage Latches 32 to receive the master data bits of the first word as indicated by the word mark on the delay line. Thus, with the sensing of the first word on the response document, the corresponding first master word on the delay line is read out into the latches 32. This word of data is also applied to Compare Circuits 31 where the master data is compared with the response data bit by bit. With each subsequent timing mark sensed, a new word of master data is read out into the storage latches 32 and a new word of response data is read into Buffer Storage Latches 27 so that the response document is compared word by word with the stored master data.

DETAILED DESCRIPTION

Before describing the detail circuits of the scoring machine, a brief description will be given of the nomenclature used in the drawings and specification. The upper and lower of two voltage levels indicate the respective presence and absence of an electrical signal. This selection is purely arbitrary and may be changed if desired, in the construction of a machine. The logic circuits, OR, AND, Trigger, Latch, Inverter, Single Shot, and Ring circuits are commonly known so that their construction need not be described in detail. The function of each circuit, however, will be given.

An OR circuit, indicated by a semicircle with an "OR" therein, is a circuit having multiple input terminals and a single output terminal such that a signal on one or more of the inputs will produce a signal at the output terminal.

An AND circuit, indicated by a box with an "&" therein, indicates a circuit having two or more input terminals and a single output terminal internally connected together so that all input terminals must have signals thereon concurrently before an output signal is produced.

A Trigger, indicated by a box with a "T" therein, constitutes a bistable flip-flop circuit having a pair of input terminals and a pair of output terminals, although only one output is shown if there is no need for the second output. The input terminals are at the left side of the box and the output terminals at the right side. A signal at the lower of the input terminals turns the trigger off so that a signal is present at the lower of the right output terminals. A signal at the upper of the input terminals turns the trigger on so that a signal appears at the upper right output terminal and no signal is present at the lower output terminal. The triggers use a self-gating signal at the input terminals from opposite output terminals 23 indicated in the drawing.

A Latch is indicated by a box with an "L" therein and has an upper or "Set" terminal and a lower or "Reset" terminal at the left side thereof and one or two output terminals at the right side. The upper of the right output termianls is the "ON" output and the lower is the "OFF" terminal. Latches are turned off and on by D.C. signals, whereas the trigger may be controlled with either a D.C. signal or an A.C. signal, such as the transition from one signal level to the other.

An Inverter circuit, indicated by a box having an "I" therein, is a circuit having a single input at the left side thereof and a single output at the right side thereof. This circuit is used to change the polarity or signal level to the opposite state from that which is present at the input side. Thus a signal present at the input will be indicated as no signal at the output and vice versa.

A Single Shot, indicated by a box with "SS" therein, is a circuit having a single input and a single output and is constructed such thata when a signal is applied to the input an output signal will be produced for a predetermined time and then will automatically terminate until a succeeding input signal is applied.

A Ring circuit, so labelled in the drawings, may comprise a series of well-known trigger circuits interconnected so that with each input signal applied to all triggers, a different trigger will be turned on to produce an output, and thus the output signal will move in sequence from the beginning trigger to the last trigger. A Ring circuit may be designated either as a closed ring or open ring in which the last trigger either conditions the first trigger for conduction or does not, respectively.

TIMING CIRCUITS

The detail circuits of the scoring machine are illustrated in FIGS. 3*a* through 3*f*, arranged as shown in FIG. 4. With reference to FIG. 3*a*, there is illustrated the source of basic timing signals which provide many of the machine control signals as will become evident. In the timing circuits, a suitable oscillator 50 provides regularly occurring output signals at the rate of one megacycle per second which is supplied to both input terminals of self-gated binary trigger 51 so that the alternate pulses turn the trigger on. The trigger serves as a frequency divider transmitting a signal to AND circuit 52 which is conditioned by the absence of a Delay Line Reset signal at Inverter 53. The absence of Delay Line Reset may be assumed at this point. The resulting Clock pulses from AND 52 are at the rate of 500 kilocycles per second or two microseconds ($\mu$ sec.) per pulse period, and provide Clock signals used elsewhere as later described. The Clock pulses also operate R-ring 54 which is a closed ring with 16 trigger stages therein. The R-ring provides sequential output signals designated RA, RB and R1–R14, each with an On terminal at the output side thereof. As will be noted, the R-ring continuously operates, except when the Delay Line Reset signal is present at AND 52. Clock signals are also supplied to Inverter 55 so that AND 56 is conditioned in the absence of a Clock signal. The remaining input signal to AND 56 is supplied by the RA signal from the R-ring. The output signal from AND 56 operates open-ended ring circuit 57, designated P-ring and having 14 stages. These stages are designated P1 through P5, P–Y, P6 through P10, PZ, PZA and PZB. This ring, however, cannot be started until a P-ring Start signal is supplied at the first or P1 stage 23 later described. However, it is to be noted that the P-ring once started, will complete its cycle even though the conditioning P-ring Start signal was removed after stage P1 was turned on. It is thus seen that the R-ring continuously cycles except for one instance, and also must step through all stages before the P-ring gets a pulse to start it or advance it from one stage to the next. These ring signals and clock signals are basic in the machine timing and are used many times subsequently.

In FIG. 5 there is illustrated the timing relationship of signals occurring during the operation of the machine circuits. The timing relation of the R-ring, P-ring and Clock pulses are illustrated in FIG. 5*f*, *g* and *h*. Reference to other portions of this figure will occur throughout the description.

The entry of data from the master document will first be considered, then the entry of data from the control and response documents will be described. With reference to FIG. 3*b* there are shown paper levers 21, 22 and 23 referred to above with regard to FIG. 2. As the master document enters reading station 16 (FIG. 2) its top or leading edge first opens normally closed paper lever 21, which de-energizes the document feed clutch (not shown), to prevent feeding the following document. The leading edge subsequently closes paper lever 22 which applies a signal to turn on latch 63 to condition AND 64 that will supply Read Head Gate signal when fully conditioned. Latch 63 also fully conditions AND 65 to provide an automatic reset signal to insure that certain of the logic circuits are in the proper state at the beginning of a scanning cycle. Several of the reset circuits have been omitted in the drawings for the sake of clarity. The document leading edge then continues under the two pluralities 17, 18 of transducers (FIG. 2) and closes paper lever 23 which turns on Latch 66 to condition AND 67. As Latch 66 is turned on, its off output goes down blocking AND 65 to remove the Auto Reset signal. When Latch 66 is turned on it also turns on Single Shot circuit 68 which sets Latch 69 on but causes Inverter 70 to block AND 71. As soon as Single Shot 68 times out, the absence of a signal to Inverter 70 fully conditions AND 71 so that AND 67 is also fully conditioned to supply a Timing Read Gate signal. At this point AND 67 and the AND 64 are supplying their respective output signals Timing Read Gate and Read Head Gate signals.

SENSING CIRCUITS

Returning now to FIG. 3*a*, the Timing Read Gate signal is supplied at one input to AND 72 and also as an input to Inverter 73. The output from Inverter 73 thus goes down at OR circuit 74 and is ineffective. It can be seen, however, that before a positive signal is applied to Inverter 73 its output was a signal to OR 74 so that trigger 75 was turned off. Trigger 75 is the Left-Right trigger which serves to control the gating of transducer banks 17, 18 of FIG. 2. As soon as the Read Head Gate signal appears from AND 64 (FIG. 3*b*) it conditions AND 76 so that when this circuit is fully conditioned, trigger 75 will be turned on (FIG. 5*b*). It is to be noted that the output signal from AND 76 is also applied to OR 74 to turn trigger 75 off if it is already on. The Read Head Gate signal is also applied to AND circuits 77 and 78 which are further supplied with signals from the output terminals of trigger 75. At this point, timing transducer 20 and transducers in bank 17 are gated to transfer part data into their buffer storage latches.

Figure 1:
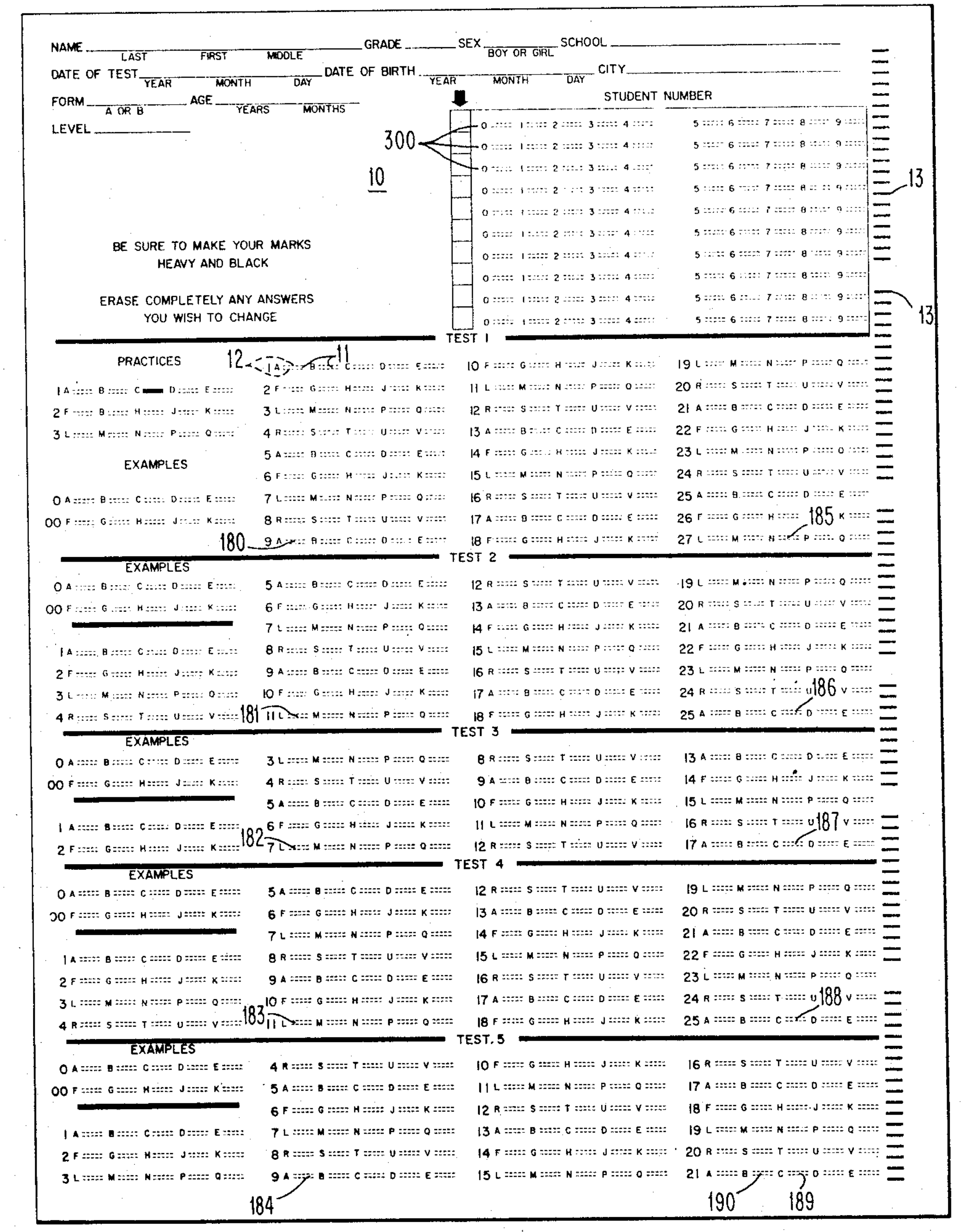
FIGURE 1 is an example of a document format which may be used with the apparatus of the invention for recording master, control and response data.

As the leading edge of the master document continues to move, transducer 20 encounters the first timing mark on the right-hand margin of the sheet as shown in FIG. 1. The presence of the first timing mark causes the transducer to generate a signal (FIG. 5*a*) which is amplified at amplifier 79 and the output is applied to OR 80 whose output is supplied to the input of AND 81. The latter circuit is already conditioned by a signal from AND 72. AND circuit 72 is fully conditioned by the output of Inverter 82 which is present when there is no signal from the P1 stage of P-ring 57, which may be assumed at this point. Thus, the presence of a timing mark under transducer 20 produces an output from OR circuit 80 and AND 81, which signal is supplied to AND 76 and also as an input to OR 80. The arrangement of circuits 80 and 81 in this manner constitute a latch and the output from AND 81 will remain until one of the input signals to AND 72 is removed. Fully conditioned AND 76 provides a signal to turn on trigger 75 which provides an output signal to AND 78 which is also fully conditioned by the presence of Read Head Gate signal. The output from AND 78 is supplied then to a plurality of AND circuits 84–1 through 84–10 along line 83. These latter AND circuits are similar to AND 81 in that they constitute a portion of a latching network for signals generated by the plurality of transducers in bank 17.

The timing marks on document 10 are positioned such that when the first timing mark is sensed by transducer 20 the first ten response positions or word one in row one is passing under transducers 17–1 through 17–10. Thus, if there are marks on master document 10, the transducers in bank 17 will provide signals to their respective amplifiers 85–1 through 85–10. The outputs of these amplifiers are fed into their respective OR circuits 86–1 through 86–10 and the outputs therefrom fully condition respective AND circuits 84–1 through 84–10. Because of the feedback loop from an AND 84 to its respective OR 86, the output from any AND 84 will remain until the signal on line 83 is removed, or in other words until trigger 75 is switched to its off condition. It may be mentioned at this point that amplifier 85 and amplifier 79 may be provided with a predetermined threshold potential which the transducer output must exceed before a signal is placed in their respective buffer latch circuits. This is accomplished by means of an adjustable resistor 87 connected to a suitable source of potential at terminal 88.

The signals present from any of AND circuits 84–1 through 84–10 are supplied to respective OR circuits 90–1 through 90–10 then to respective AND circuits 91–1 through 91–10 (FIG. 3*b*) from where the recognized mark signals are transferred to the delay line memory. Each AND 91–1 through 91–10 is fully conditioned in sequence by pulses R1–R10 from R-ring 54. In FIG. 3*b*, as each AND 91–1 through 91–10 is pulsed its output signal appears at OR circuit 92 and at three-input AND circuit 93. A second input to AND 93 is the Read Head Gate signal on line 94 and the third input is through switch contact 95*a* which connects to a suitable conditioning potential at terminal 96. The output pulses from AND 93 each representing a sensed mark, are supplied to OR 97 which is connected to Data Entroy switch 28A (FIG. 3*c*).

As noted thus far in FIG. 3*a*, when the first timing mark was sensed by transducer 20, Left-Right trigger 75 was switched on to permit transducer bank 17 to store mark signals by conditioning AND circuits 84–1 through 84–10. These stored signals were then sequentially sensed by AND circuits 91–1 through 91–10. Transducer bank 18 is similarly controlled. The remaining ten response positions in the first row on sheet 10 (FIG. 1) are sensed by transducers 18–11 through 18–20 in FIG. 3*a*. This occurs when transducer 20 encounters the second timing mark (FIGS. 5*a* and *b*). The resulting signal appears from amplifier 79 to OR 80 and at AND 81. AND 81 is fully conditioned by the absence of P1 signal from P-ring 57. Thus with the Read Head Gate signal present at AND 76, the Left-Right trigger 75 is switched off by the signal from OR 74. The resulting off output from trigger 75 blocks AND 78 and conditions AND 77 to provided a signal on line 98 to gate AND circuits 84–11 through 84–20. Any signals from transducers 18–11 through 18–20, amplified at 85–11 through 85–20, are applied to OR circuits 86–11 through 86–20 to respective gated AND circuits 84–11 through 84–20. The feedback between the latter AND circuits and respective OR circuits 86–11 through 86–20 serves to provide a buffer latching effect until the signal on line 98 terminates. These latched signals appear at respective OR circuits 90–1 through 90–10 to supply mark signals to AND circuits 91–1 through 91–10 as in the case of signals from transducer bank 17. Thus the last-mentioned OR and AND circuits are used twice for each complete horizontal row of response positions on a document. AND circuits 91–1 through 91–10 are gated by another sequence of R1 through R10 pulses.

DATA STORAGE CONTROL

In entering the master data in the machine memory it will be recalled that switch 28 (FIG. 2) was positioned to direct the data read by the mark transducers from the temporary or buffer latch circuits to the delay line. This switch is moved before the master document is fed into the sensing station and is shown in FIG. 3*c*. Switch 28 is designated the Program Load switch and comprises two sections 28A and 28B, mechanically coupled to move together. This switch is first moved by the machine operator to the Clear position 100*a* then to the Load position 100*c*. The wiper of section 28B also moves to corresponding positions 101*a* and 101*c*. When the switch sections are in their respective positions 100*a*, 101*a*, a suitable potential at terminal 102 is applied as a signal to Inverter 103 which blocks AND circuits 104, 105 by removing one of the necessary conditioning signals. Thus, no signals can enter OR 106 to Delay Line 107 as long as these AND circuits are blocked.

The delay line may be any conventional device such as a magnetrostrictive line, mercury tank or other delay device with suitable input and output transducers. When the entire document is used for responses, the delay device must have a capacity for storing the information bits for 100 words. However, in order to provide control data for the readout of part and total scores at the end of each response document, an additional six words of storage are used. As will be seen later, each word is allotted 16 bits or a bit for each R-time from the R-ring 54 (FIG. 3*a*). With the R-ring being advanced by the 500 kilocycles per second from the on output of trigger 51, it is seen that each bit time is 2μsec. This means that the total delay in line 107 for 106 words of storage must be at least 3392 microseconds or 3.392 milliseconds for the 1696 possible bits that can be stored therein. The actual delay of the line, however, is one bit or two microseconds less as will be seen later in the description of the bit regeneration circuits. Thus a momentary depression of the switch for at least 3.392 milliseconds will remove or clear all bits from the Delay Line 107. When switch 28B is connected with terminal 101*a*, the signal also appears on line 108 which is applied to reset First Entry latch 109 off and to Inverter 53 (FIG. 3*a*) so that the R-ring is inhibited until the switch is moved.

After the delay line reset is completed, switch sections 28A and 28B are moved to the Load positions 100*c* and 101*c*, respectively, as shown. Section 28A connects with one input of two-way AND 110 and section 28B provides a signal to set First Entry latch 109 on and to apply a signal to OR 111 holding Read Out latch 112 off. When latch 109 is turned on it remains on until the delay line is cleared again. When this latch goes on, an A.C. signal is provided to turn on trigger 113 so that a signal conditions AND 114. Since switch section 28B is no longer providing an inhibiting signal to the R-ring 54 (FIG. 3*a*) via line 108, the R-ring is stepping freely through its stages so that when stage R14 turns on, AND 114 becomes fully conditioned and provides an output signal to OR 115 as an input to three-input AND 104. Inverter 103 no longer has a signal applied thereto so a second input to AND 104 is present, and the last conditioning signal is the absence of a Clock signal to Inverter 116 from AND 52 (FIG. 3*a*) which occurs when trigger 51 is off or every other oscillator cycle. Thus AND 104 becomes fully conditioned during R14 time and enters a signal through OR 106 on Delay Line 107. This bit is the first bit and only R14 bit on the previously cleared delay line and is called First Entry Mark. This mark designates arbitrarily one end of the delay line storage and it continuously recirculated through the line until the line is recleared. It will also be noted that when the signal from AND 114 disappears at the end of R14 time, the absence of a signal at Inverter 117 provides a signal to turn off trigger 113 so that AND 114 cannot be reconditioned at R14 time again until the Delay Line 107 has been cleared.

DATA REGENERATION

The manner in which the first Entry Marks and any other bits are regenerated during storage has been disclosed and claimed in United States Patent No. 3,165,721 issued January 12, 1965, to James J. Kennedy and James C. Rogers, and assigned to the same assignee as this application. A brief description of the regeneration circuits will be helpful here. A pulse entered on Delay Line 107 is delayed for 3390 microseconds in its travel down the line. It then appears on line 120 at threshold Detector 121 where the peak thereof is transmitted to turn Skew trigger 122 on. A Clock signal from AND 52 (FIG. 3*a*) appears each bit time on line 123 at OR 124 and AND circuits 125, 126. When Skew trigger 122 is turned on, its output fully conditions AND 126 with the occurrence of the next Clock signal so that Data trigger 127 is turned on supplying a signal on line 128. The latter Clock sigalso resets Skew trigger 122 off so that the next occurring Clock signal fully conditions AND 125 to turn Data trigger 127 off. It may be noted that triggers 122 and 127 are turned off consecutively by succeeding clock pulses if a bit pulse was present from Detector 121. It thus requires a delay of 1 bit time for a pulse to be transmitted through these triggers. Triggers 122 and 127 provide regenerated pulses for the delayed pulses that become attenuated during travel along the delay line, and also permit a variation in arrival time at trigger 122 by half the clock pulse period to compensate for slight variations in delay of the data bits.

Pulse signals appearing on line 128 are supplied to AND 129 which is always fully conditioned except at RA time which causes Inverter 130 to block AND 129. The reason for blocking RA pulses in the delay line regeneration circuits is explained hereinafter. Pulses supplied from AND 129 appear from OR 131 on line 132 at AND 105 which is jointly fully conditioned by the absence of each Clock pulse at inverter 116 and the signal from Inverter 103. No input signal is present at Inverter 103 since switch 28B is currently at terminal 101*a*. It can thus be seen that the R14 bit stored on Delay Line 107 is continuously regenerated and circulated. It will also be noted that the First Entry Mark at R14 time is stored on the line immediately after switch 28 has been moved to the Load position, which is done before the master document has been fed.

DATA STORAGE

The storage of master information on the Delay Line 107 will now be described. After master document 10 has been fed and moved sufficiently to close the paper levers 21, 22 and 23 (FIG. 3*b*), the Timing Read Gate signal occurs from AND 67 as soon as Single Shot 68 times out. The Timing Read Gate signal is applied to three-input AND 140 in FIG. 3*c*. A second input is the signal from AND 147 which is activated by coincidence between the First Entry Mark stored on the delay line, coming from Data trigger 127, and the R14 pulse from the R-ring. The third input for AND 140 is the off output signal from First Word Mark latch 141 which can be assumed reset at this time. When AND 140 is fully conditioned, its output is applied through OR 142 to Inverter 143. The result is signal absence from the inverter output until the end of First Entry Mark signal which blocks AND 140 so that the inverter produces a switching signal to turn on self-gated Work Mark Advance trigger 144. The trigger signal occurs immediately after R14 time which is actually the beginning of RA time and provides a "word mark" on line 159 which appears at OR 115 and AND 104. The latter AND is conditioned by Inverter 103 and absence of Clock signal at Inverter 116. The "word mark" signal designates the space on the delay line that is to receive the next word of bits, in this instance, the bits from the first word on the master document.

It will be noted that when trigger 144 turns on, its output signal also turns on the First Work Mark latch 141 so that the off signal thereof disappears to block AND 140. Trigger 144 is immediately turned off by the next Clock signal. The First Word Mark latch 141 stays on, however, until the Timing Read Gate signal from AND 67 (FIG. 3*b*) goes off to Inverter 145 which occurs when paper lever 23 opens at the trailing edge of the document. Latch 141 being on prevents any further signals from activating AND 140 until the next document is fed. The "word mark" will continue to be regenerated until a data word is written. Regeneration is accomplished by supplying the stored "word mark" from data trigger 127 on line 148 to AND 149 which is fully conditioned by RA time from the R-ring. The output signal from AND 149 is supplied to AND 150 that is conditioned by Timing Read Gate signal from AND 67 (FIG. 3*b*) and absence of a signal to Inverter 151 which can be assumed at this time. The output signal from AND 151 is supplied through OR 131 on line 132 to delay line input AND 105 for another delay cycle.

When timing mark transducer 20 provides its signal from AND 81 (FIG. 3*a*), the signal is applied to turn Scan Single Shot 152 on (FIGS. 5*c* and *d*). This single shot allows a predetermined time to elapse before the buffer latch outputs from AND circuits 84–1 through 84–10 (FIG. 3*a*) are sampled at AND 91–1 through 91–10 (FIG. 3*b*) for storage. In other words, either of the gated transducer banks 17 and 18 are provided with a designated time after a timing mark is sensed by transducer 20 in order to read and store the marks sensed in the document response positions. When single shot 152 (FIG. 3*c*) turns on, its signal turns on P-ring Alert latch 153 and blocks AND 155 through Inverter 154. As soon as the single shot turns off, Inverter 154 applies a conditioning signal to AND 155. The signal from latch 153 remains present and when R14 time occurs, AND 155 provides a signal to turn on P-ring Start latch 156 which conditions AND 157. The P-ring Start latch is turned on at the next occurring R14 time, waiting to provide a start signal to the P-ring 57 (FIG. 3*e*) when the "word mark" occurs at the delay line output indicating where a master data word is to be stored. As soon as AND 149 provides a signal by the coincident occurrence of the stored RA bit (word mark) and an RA pulse from the R-ring (FIG. 3*a*), AND 157 becomes conditioned so that the P-ring starts its cycle (FIG. 3*a*). Since the "word mark" can be anywhere on the line, the wait will vary from 2 to 3392 microseconds.

The output signal from AND 157 is also applied to Inverter 151 to block AND 150 for the duration of the signal from AND 149, so that the "word mark" is not regenerated through AND 150. It will be recalled that the delay line was loaded with the last half of each Clock signal so that AND 157 will be conditioned when the "word mark" appears at AND 147. This permits the "word mark" to be reinserted one word later or at the end of the last-stored data word. The new "word mark" is replaced at the end of P1 time which is on for a full cycle of the R-ring. This is accomplished by AND circuit 158 which is gated to provide an output signal when the P1 signal and R14 signal occur in coincidence. The resulting signal from AND 158 produces an output signal from OR 142 which is inverted by 143. As soon as the input to Inverter 143 disappears, which is actually the beginning of RA time, the output thereof turns on Word Mark Advance trigger 144. The signal of trigger 144 is applied on line 159 to OR 115 for insertion on delay line 107 through AND 104 and OR 106.

When the P-ring start signal was produced at AND 157, it was applied to gate the first stage P1 of P-ring 57 in FIG. 3*a* so that the ring was turned on when AND 56 provided its next signal. Once started, the P-ring will advance one stage with every RA pulse until the last stage PZB is turned off.

To accomplish storage of the master data words, only stage P1 is used. Stage P1 is connected to AND circuit 165 whose other input is through switch 28A at terminal 100*c* in FIG. 3*c*. The P1 signal also stops the timing mark siganl at AND 81 through Inverter 82 and AND 72 (FIG. 3*a*).

It will be recalled that the marks sensed by the transducers in bank 17 are stored as signals in the buffer latches comprising OR circuits 86–1 through 86–10 (FIG. 3*a*). The stored signals are also present as inputs to respective ones of AND circuits 91–1 through 91–10 in FIG. 3*b*. Each of these latter AND circuits is succesisvely conditioned by R-ring signals, R1–R10, so that any AND circuits 91 having mark read (MR) signals present will provide output signals in turn from AND 93 through OR 97 to switch 28A in FIG. 3*c*. Thus, when the P1 signal is present at AND 165, any signals occurring during R1–R10 times are applied to OR 115, then AND 104, and finally to OR 106 for entry on the delay line. The information read by transducer bank 17 is stored in memory and recirculated through the regeneration circuits, as described above, until the delay line is cleared.

In order to condition the P-ring Alert latch 153 and P-ring Start latch 156 to be turned on by the next timing mark, a P1 signal and R13 signal are combined at AND circuit 166 which transmits a signal to OR 167 which turns off these two latches. As soon as the next timing mark is sensed, which is later by many cycles of the R-ring, Scan Single Shot 152 again turns on.

The information from transducer bank 18 for the right hand ten response positions of the master document is entered into the delay line memory in the same manner as that for transducer bank 17. As the document continues its forward motion through the sensing station, timing transducer 20 (FIG. 3*a*) encounters the next or second timing mark. The signal from the timing mark (FIG. 5*a*) produces a signal through amplifier 79, OR 80, AND 81, AND 76 and OR 74 which turns Left-Right trigger off to energize line 98 through AND 77. This permits the mark signals produced by cells 18–11 through 18–20 to be stored in their respective buffer latches comprising OR circuits 86–11 through 86–20 and AND circuits 84–11 through 84–20.

The timing signal produced at the output of AND 81 also turns on single shot 152 in FIG. 3*c*, which turns on the P-ring Alert latch 153. AND 155 becomes fully conditioned when the single shot times out and an R14 signal occurs so that the P-ring Start latch 156 is turned on. As soon as the stored "word mark" is read from the delay line at Data trigger 127 in conjunction with RA time at AND 157, the "word mark" is inhibited from being regenerated until the end of coincidence of P1 and R14 times at AND 158 to set Word Mark Advance trigger 144, entering a new "word mark," one word time later in the delay line via line 159 to OR 115.

As soon as the P-ring was started again at AND 157, AND circuit 165 was conditioned to enter data bits coinciding with R1–R10 signals at AND circuits 91–1 through 91–10. The entry of data from the remainder of the master document continues, with the Left-Right trigger being turned on and off alternately for each timing mark sensed. Each two successive words stored in memory thus represent the data for a row of response positions.

When the trailing edge of the document passes through the sensing station, it permits paper lever 21 to close in FIG. 3*b* and permits another document to be fed, if present in the machine hopper. Continued movement of the master document allows paper lever 22 to open which removes the set signal from latch 63 and causes Inverter 170 to set PL2 Open latch 171 on. Latch 171 turning on produces a reset signal at PL2 latch 63 turning it off. Latch 63 is thus turned off when paper lever 22 is opened at the end of a document. This permits detection of a paper jam. When latch 63 is turned off, a signal is supplied to OR 173 to turn off PL3 latch 66 which will not allow latch 66 to be est on unless latch 63 is set on first. Latch 66 is also reset when paper levers 23 open at the trailing edge of the sheet since a signal occurs from Inverter 174 which is applied to OR 173. When PL3 latch 66 is turned off its output signal provides a conditioning signal to AND 65, turns off PL2 Open latch 171, and turns off PL4 latch 69. AND 65 is conditioned so that when PL2 latch turns on with the next document, a reset signal is provided, for example, to OR 167 (FIG. 3*c*) to the P-ring Alert and P-ring latches in case they are on. When the PL3 latch 66 and PL4 latch 69 are turned off, AND circuits 71, 67 and 64 are blocked so that the Timing Read Gate and Read Head Gate signals are removed. The absence of the former signal blocks AND 140 in FIG. 3*c* to prevent operation of the Word Mark Advance trigger, resets First Word Mark latch 141 through Inverter 145, and blocks AND 150 to prevent regeneration of the stored "word mark." Thus, at the end of a document, the stored "word mark" is removed and not replaced. The absence of the Timing Read Gate signal also blocks AND 72 in FIG. 3*a* so that extraneous marks or matter between documents cannot produce a signal from timing transducer at AND 81.

STORING CONTROL SIGNALS

Subsequent to the storing of master data in the delay line memory, control data is stored which may be used to indicate to the machine an end of test part (EOP) or counter read out. Control data bits are stored in much the same manner as master data. Another document identical to that used for master data is marked with the desired bits. For example, an EOP may be indicated by marking the sixth response position in the next to last word of a part as at positions 180, 181, 182, 183 or 184 on document 10 in FIG. 1. The scoring machine may be equipped with two counters to tally scores on a parts and entire basis. For example, a parts counter may be used to accumulate scores for each test part and a total counter may have the parts scores transferred thereto at the end of each part in order to accumulate the total scores for transfer to a printer or punch. The transfer of parts scores to the total counter and total counter read out are controlled by control signals stored on the delay line. Parts score transfer is indicated by a mark in the eighth response position of the last word in a part such as 185, 186, 187, 188 and 189. Read out of the total counter is controlled by a mark in the seventh response position in the last word which will be scored such as position 190.

Before passing the control sheet through the machine, switch 95 is transferred to terminal **95*b*** (FIG. 3*b*). The control document is now fed through the machine in the same manner as the master document. The progression of the document under the paper levers 21, 22 and 23 (FIG. 3*a*) again establishes Timing Read Gate and Read Head Gate signals that permit timing marks to be sensed and introduce a "word mark" immediately after First Entry Mark on the delay line. The "word mark" is recorded by the coincidence of R14 and First Entry Mark at AND 147 which fully conditions AND 140 turning Word Mark Advance trigger 144 on at the end of the R14 signal. First Word Mark latch 141 is turned on by the signal from trigger 144 to block AND 140 so that the succeeding "word marks" are entered via normal regeneration through AND circuits 149 and 150, or through AND circuits 149 and 150, or through AND 158 when a timing mark is sensed.

As each timing mark is sensed by transducer 20, the Left-Right trigger is operated alternately as described for the storage of master data in order to gate the control mark data into the buffer latch circuits comprising OR circuits 86–1 through 86–20 and AND circuits 84–1 through 84–20. However, only the latch circuits for transducers 17–6, 17–7, 17–8 or 18–16, 18–17 and 18–18 will encounter any marks. Output signals will be present only from OR circuits 90–6, 90–7 and 90–8, and are applied as respective input signals to AND circuits 191, 192 and 193 in FIG. 3*b*. These latter AND circuits are respectively sampled by the RB, R11, and R12 signals from R-ring 54 (FIG. 3*a*). The resulting output control signals are supplied to OR 194, AND 195 gated by the signal from AND 196, OR 97, and to switch 28A at terminal **100*c*. AND 195 and switch 95*b* insure that only marks in control positions will be stored. When the P-ring is started in response to each timing mark, the resulting P1 signal gates AND 165 so that the control bits are added in the delay line through OR 116, AND 104 and OR 106**.

It will be recalled that the "word mark" advances one word position on the delay line with each timing mark sensed. Therefore, the control bits are entered in the word position in storage corresponding to the word in which the marks occurred on the control data document. After the control data document has been sensed and the mark signals stored, the machine can be set in a scoring mode to score response documents.

QUESTION LENGTH SWITCHES

The scoring of response documents is accomplished by first setting switch 28 to the OFF position at terminals **100*b* and 101*b***. This prevents the storage of any more bit signals on the delay line. Additionally, switches must be set to control the manner in which each test part is to be scored. These switches are Question Length Switches determining the number of response positions allotted each question in each test part. There is one switch illustrated in FIG. 3*d* for each of three parts. Thus Part I is controlled by the setting of switch 200 having sections A and B ganged together; test Part II is controlled by switch 201A and B; and test Part III is controlled by switch 202A and B. The number of test parts under separate control of a switch is arbitrary, and as will be evident, additional switches can be added.

In the comparison of response marks with stored master data, each response position for a question requires a full cycle of the R-ring or one stage of the P-ring for gating purposes, and the time equivalent to one P-ring stage between questions. The time between questions is required for various machine functions such as signaling End of Question (EOQ), adding into the counters and determining the presence of too many responses per question. This can be seen by noting the provision of extra stages PY and PZ in the P-ring in FIG. 3*a*. (See FIG. 5*g*.) Stages PZA and PZB are provided at the end of a data word for control purposes regarding the End of Part (EOP) and counter readout and transfer. Since most tests or questionnaires use five response positions per question, the reservation of the required time is made directly in the P-ring so that data bit comparing is done with stages P1–P5 and P6–P10. However, when the response positions per question is two, three or four, other circuits must be used to provide the proper reservation of a P-ring stage.

The reservation of P-ring stages is accomplished by setting switches 200, 201 and 202 in accordance with the number of response positions for each test part. By way of illustration, it will be assumed that Test Part I has five response positions per question; Part II has four response positions and Part III has two response positions. Thus each bank of transducers can examine simultaneously two questions having five, four or three response positions or four questions having two response positions each.

The test part being scored is controlled by trigger stages 203 and 204 forming a binary counter and the outputs of these triggers are coupled together to indicate the count standing therein. Assuming the application to OR circuit 205 of a general reset signal which may be obtained from any suitable source, for example from AND 65 (FIG. 3*b*), both triggers are turned off via OR circuits 206 and 207. The off signals from the triggers are applied to gate AND 208 so that a signal is supplied to the wiper of switch 200B and as one input to AND 209. As the document progresses through the machine, the End of Part (EOP) control bit on the delay line will be detected which sets a latch, as will be described later, supplying a signal at AND 210. With the occurrence of an R11 signal from the R-ring, AND 210 will be fully conditioned and supply a signal turning trigger 203 on. The on output from this trigger is coupled with the off output from trigger 204 at AND 211 to indicate the beginning of Part II for scoring at switch 201B and AND 212. The following EOP pulse encountered from the delay line will advance the binary triggers to indicate the following Part III at AND 213 applying a signal at switch 202B and AND 214. At the third EOP pulse AND 213*a* is activated to reset both triggers off through OR 205 energizing AND 208 again. In this case the EOP signal indicates the end of the third test part, and if another part is present on the document, it will be scored in the same manner as Part I. A fifth test part is scored the same as Part II and so on. This sequence can be altered by providing additional EOP marks on the control document to advance the counters, for example, two counts. Two consecutive words are used. The circuitry may be changed, however, to provide different scoring for each part, as desired, by adding additional trigger stages and more logic circuits.

When switch 200 is set so that wipers A and B contact the "5" terminals 215*b*, the Part I signal is not used at the B section. When the PY stage of the P-ring is on, that signal appears at terminal 215*a* and is supplied on line 216 to fully condition AND 209 providing an EOQ signal at OR 217. The next EOQ signal is applied directly to OR 217 by stage PZ connected thereto. Thus, when each question has five response positions an EOQ signal is supplied at PY and PZ time.

Switch 201 is set at the "4" terminals 218*a* and 218*b* to indicate the questions in Part II each have four response positions. The P5 and P10 stages are coupled to OR 219 so that these signals are applied on line 220 through switch 201A to line 221 as input signals to AND 212. When an output is provided from AND 211, AND 212 is fully conditioned so that EOQ signals occur with P5, P10 and PZ pulses.

Switch 202 is set at the "2" terminals 222*a* and 222*b* to indicate the questions in Part III each have two response positions. The P3, PY and P8 stages are connected to OR 223 and supply their signals on line 224, through switch 202A, on line 225 to fully condition AND 214 so that EOQ signals appear at P3, PY, P8 and PZ times. The necessary EOQ pulses are generated in a similar manner for questions having three response positions each.

In reading the information from a response document, the various P-ring signals are used to gate circuits that scan the transducer buffer latch outputs from OR circuits 90–1 through 90–10 (FIG. 3*a*). The P-ring gating signals are also controlled by the setting of switches 200, 201 and 202 in FIG. 3*d*. This is accomplished by inhibiting certain of the P-ring signals according to the number of response positions per question for the test part being scored. Accordingly, when the B section of any switch 200–202 is set on "4," the Part signal for that switch appears on lines 230 and 231 at Inverter 232, so that AND 233 is blocked. As a result neither the P5 nor P10 signals are propagated through AND circuits 234 and 235. When no signal is present on line 230 both the P5 and P10 signals appear at the outputs of these AND circuits and are designated HP5 or HP10.

If any of the test part switches are set at the "3" terminal, a part signal appears on lines 236 and 237 at Inverter 238 to block AND circuits 233, 239 and 240. This prevents the generation of signals at P4, P9, P5 and P10 times. In the absence of a part signal on line 236, these P-ring times are available as HP4, HP9, HP5 and HP10.

When any test part switch 200–202 is set at the "2" terminal, a part signal will appear on lines 241 and 242 at Inverter 243 so that the P3 and P8 signals at AND circuits 244 and 245 are inhibited. If no part signal is present on line 241 then the P3 and P8 signals are available as HP3 and HP8.

DOCUMENT SCORING

After the Question Length switches 200–202 have been appropriately set for the test parts, the response documents are fed successively through the sensing station. The leading edge of the response document operates the paper levers 21, 22 and 23 (FIG. 3*b*) producing Timing Read Gate and Read Head Gate signals as was described above for the master document. The presence of a Timing Read Gate signal conditions Word Mark Regen AND 150 in FIG. 3*c*, and, in addition, AND 140. The latter has an input from First Word Mark latch 141 and becomes activated when a circulating pulse (First Entry Mark) on the delay line coincides with an R14 signal at AND 147 to provide an output therefrom. At the end of the R14 pulse, Word Mark trigger 144 is turned on to provide a "word mark" on line 159 at OR 115, and to turn on latch 141 blocking further input during the scanning of the current response document. The "word mark" is entered adjacent the First Entry Mark on the delay line and designates the first stored word to be read out upon signal.

The Timing Read Gate signal, in the absence of a P1 signal at AND 72 (FIG. 3*a*), and the Read Head Gate signal together supply conditioning signals to AND circuits 81 and 76, respectively, so that the timing mark signal from transducer 20 turns Left-Right trigger on to gate buffer latch AND circuits 84–1 through 84–10.

Mark signals produced by the transducer bank 17 are stored in the latches. The timing mark signal is also applied to Scan Single Shot 152 in FIG. 3*c* which turns on the P-ring Alert latch and subsequently allows Inverter 154 to provide a signal at AND 155. With the signal from latch 153 also present, AND 155 becomes fully conditioned at the next occurring R14 signal to start P-ring 57 (FIG. 3*a*) and inhibit "word mark" regeneration at AND 150.

Figure 3F:
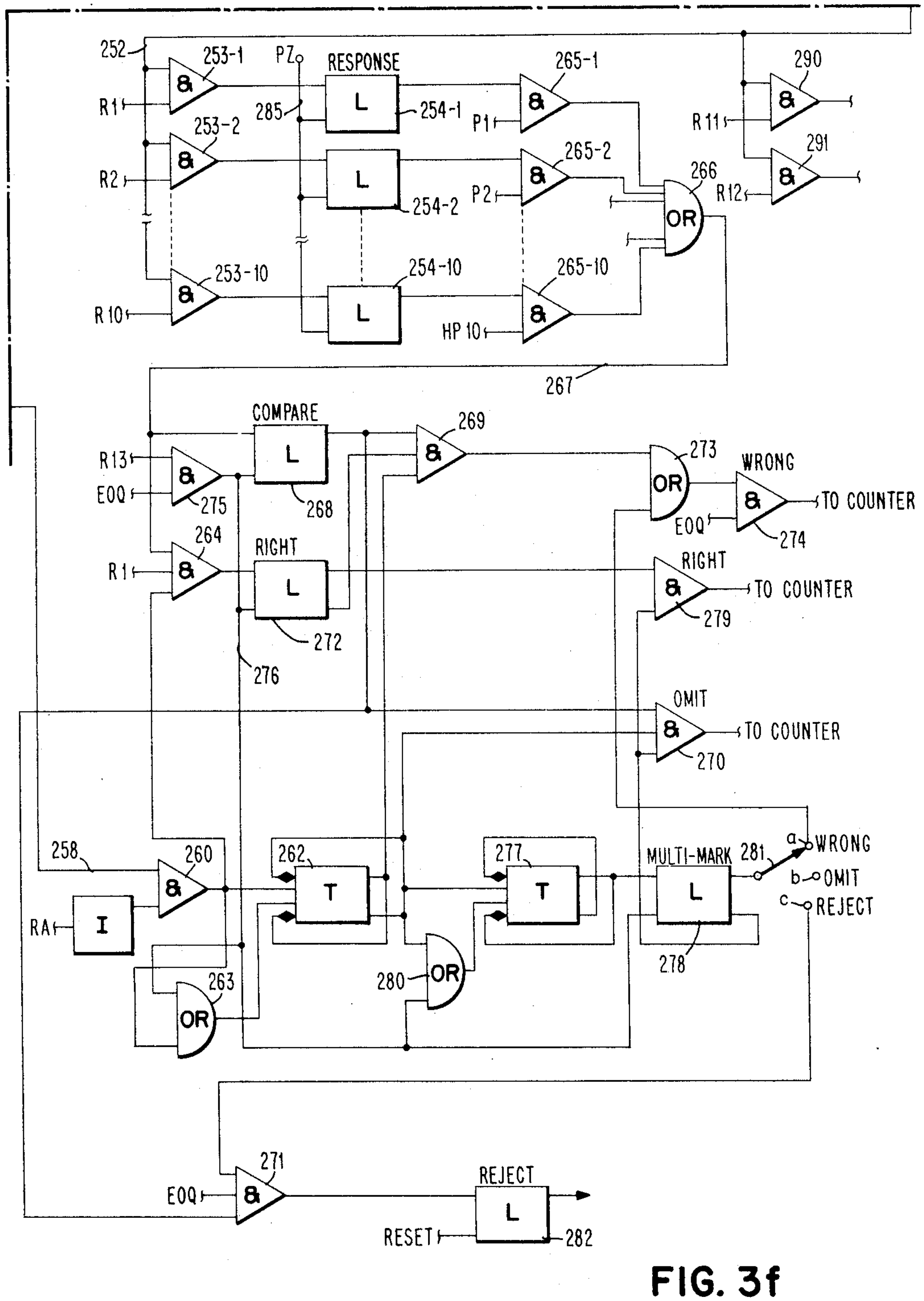

When the P-ring starts, the P1 signal inhibits the timing mark signal at AND circuits 72 and 81 (FIG. 3*a*) and turns on Data Read Out latch 112 in FIG. 3*c*. The output signal from latch 112 on line 250 conditions AND 251 to which Clock pulses are also supplied. The remaining input to AND 251 is the circulating data appearing from Data trigger 127. Each data bit occurring during P1 time is read out on line 252 which is connected to a plurality of AND circuits 253–1 through 253–10 (FIG. 3*f*). Each of these AND circuits is gated by an R-ring signal R1–R10 in succession and if a signal occurs 252 when one of these AND circuits is conditioned, the coincidence turns on one of the Response latches 254–1 through 252–10. Therefore, during P1 time, any bits occurring in the first word of data are stored in latches for subsequent comparison with the responses encountered. Thus the correct answers may have occurred during R2 and R10 time and the corresponding Response latches 254–2 and 254–10 would be turned on.

As soon as P14 time occurs in coincidence with P1 time, AND 158 (FIG. 3*c*) is conditioned to supply a signal through OR 142 to Inverter 143. At the end of R14 time Word Mark Advance trigger 144 is turned on, having been turned off by a clock signal, so that a new "word mark" is supplied on line 159. The "word mark" signal is placed on the delay line through OR 115, AND 104 and OR 106, and also turns off the Data Readout latch 112 so that no more data is read off the line until after the next timing mark is sensed.

As soon as the P-ring started to read out the master data word from storage, the mark data for that word was being scanned. As described above, marks sensed by transducers 17–1 through 17–10 in FIG. 3*a* are stored as signals in latch circuits comprising AND circuits 84–1 through 84–10 and OR circuits 86–1 and 86–10. These signals remain until the next timing mark is sensed and appear at OR circuits 90–1 through 90–10. The outputs of these OR circuits are scanned at AND circuits 91–1 through 91–10 in FIG. 3*b* and transmitted to switch 28 when data is stored. However, when scoring a document, switch 28 (FIG. 3*c*) is open, and the mark signals at OR circuits 90–1 through 20–10 are scanned by a respective P-ring signal at respective AND circuits 255–1 through 255–10 (FIG. 3*e*). Each of the latter AND circuits are successively gated during a different P-ring signal or P-ring originated signal. Thus AND 255–1 is gated at P1 time, AND 255–2 at P2 time, AND 255–3 at HP3 time, etc. It will be recalled that the HP signals are produced through the circuits of FIG. 3*d*, described above. Assume that test Part I is being scored, that each question has five response positions, and that marks were sensed by transducers 17–3 and 17–10. In this case AND circuits 255–3 and 255–10 have signals present on lines MR3 or 13 and MR10 or 20. No mark response will occur from any AND circuit 255–1 through 255–10 until the P-ring reaches stage P3 when an HP3 signal is generated at AND 244 (FIG. 3*d*). At this time AND 255–3 is fully conditioned so that a signal appears as an input to OR 257 on line 256. This signal is transmitted on line 258 to AND 260 in FIG. 3*f*. A signal is produced from AND 260 in the absence of an RA signal at Inverter 261 which is applied to triggers 262, OR circuit 263, and AND 264.

The gating P-ring signals applied to condition AND circuits 255–1 through 255–10 (FIG. 3*e*) are also used to gate the Response latches for readout of AND circuits 265–1 through 265–10 (FIG. 3*f*) so that those latches turned on will provide a signal through OR 266 on line 267 to AND 264 and also to turn on Compare latch 268. For example, if latch 254–2 was on, latch 268 would be turned on during P2 time when AND 265–2 was fully conditioned; its output would provide a gating signal to AND circuits 269, 270 and 271. The Compare latch, when turned on, remains so until reset at EOQ time.

If, according to the example, no mark signal occurred during P2 time when the correct answer occurred, no later output from AND 260, such as at HP3 time, can cause a signal from AND 264 to turn on Right latch 272 for that question, because AND circuit 264 will not have all inputs present. In this example, trigger 262 is turned on at HP3 time so that an output is provided at AND 269. Thus, the off output signal from Right latch 272 fully conditions AND 269 so that a pulse is present through OR 273 to AND 274. When the EOQ pulse occurs from OR circuit 217 at PY time, a "wrong" count signal is generated from AND to 274 which may be supplied to a suitable counting device. The first five document response positions have now been scanned, compared with the first five bit positions of storage, and a result produced.

The EOQ pulse is also supplied to AND 275 where, in conjunction with the R13 time for the PY signal, a signal is provided along line 276 as a reset signal for latches 268, 272, triggers 262, 277 and Multi-Mark latch 278.

As the P-ring continues from stage PY through stage P10, each of AND circuits 255–6 through 255–10 (FIG. 3*e*) and AND circuits 265–6 through 265–10 will be gated in succession. Assuming that a signal was present only at AND 255–10 (FIG. 3*e*) from OR 90–10 (FIG. 3*a*), a mark signal will occur at AND 260 during HP10 time, gating AND 264 and turning on trigger 262. Assuming then that latch 254–10 had a master bit signal stored, AND 265–10 is conditioned also during HP10 time to provide a signal, turning on Compare latch 268 and conditioning AND 264. With the occurrence of an R1 pulse during P10 time, Right latch 272 is turned on. This on condition of latch 272 blocks AND 269 but conditions AND 279. With latch 278 off, AND 269 provides a counter signal, indicating a right answer. Thus, one data word has been used to score the response positions for two questions. A reset signal occurs from AND 275 when a PZ signal from OR 217 (FIG. 3*d*) and an R13 signal coincide so that latches 268, 272 and 278 and triggers 262 and 277 are each turned off.

Provision is made in the comparing circuits of FIG. 3*f* for determining whether two or more marks were sensed for each question. Assume that, in the second question scored above, a signal also occurred from AND 255–9 (FIG. 3*e*) at HP9 time. This signal would turn trigger 262 on from AND 260. Afterward, when a signal appeared at AND 260 at HP10 time, trigger 262 is turned off through OR 263. When trigger 262 turned off, its output signal through OR 280 turns trigger 277 on so that the latter's output signal sets Multi-Mark latch 278 on and a signal appears at switch 281. When latch 278 turn on, the absence of a signal at its off output blocks AND circuits 270 and 279. Switch 281 may be set at any one of terminals **281*a*, *b* or *c* to determine the disposal of multiple responses to a question. It set at 281*a*, the presence of two marks signals is counted as wrong through OR 273 and AND 274; if set at 281*b*, no indication of multiple marks will occur; if set at 281*c*, the Multi-Mark latch signal is applied at AND 271 which is gated by the Compare latch output and the EOQ signal. At EOQ time a signal occurs from AND 271 to turn on Reject latch 282 which may be used to direct the document to a reject hopper. In the instance that three marks were sensed for a question, trigger 262 is again turned on to condition AND 269, but and circuits 270 and 279 are blocked by the Multi-Mark latch output. Further, if not one of the three response marks was correct, AND 269** is fully conditioned so that a "wrong" signal is generated.

After scanning the first word, the PZ signal also resets the Response latches 254–1 through 254–10 on line 285, in addition to providing an EOQ signal. In the description of scoring the 2 five reponse question, it is to be noted that P-ring times of PY, PZ, PZA and PZB were not used for scanning data in the buffer and Response latches. PY and PZ were used, however, for providing EOQ signals. The PZA and PZB signals are used respectively for End of Part and Counter Readout.

The scoring of the next word of master and response data starts as soon as transducer 20 senses the next timing mark on the response document. At this time Left-Right trigger 75 (FIG. 3*a*) is turned off through OR 74 to gated transducer bank 18 so that mark data is sensed in the last ten positions of the row. The timing mark signal again turns on Scan Single Shot 152 (FIG. 3*c*) which subsequently starts the P-ring to repeat the cycle of comparing just described. As soon as the stored "word mark" is sensed, the next master data word is read out to the Response latches and the "word mark" is reinserted one word time later.

During the subsequent master data readout, each word is also examined for the presence of control bits. The delay line readout pulses from AND 251 (FIG. 3*c*) are also applied to AND 286 in conjunction with an RB pulse to provide a set signal to EOP latch 287. The latch signal is coupled with the PZA signal from the P-ring at AND 288, which results in an EOP signal. The EOP signal is combined with the R11 signal during PZA time at AND 210 (FIG. 3*d*) to advance the test part counter triggers 203, 204. The first EOP signal turns on trigger 203 so that with trigger 204 off, AND 211 is activated to indicate Part II. Each succeeding EOP signal advances these triggers one count to indicate the later test parts. The EOP latch 287 is reset upon coincidence of R14 and PZA signals at AND 289.

The output from AND 251 (FIG. 3*e*) on line 252 is also supplied to AND circuits 290 and 291 and combined with R11 and R12 signals, respectively. When coincidence occurs at either of these gates, a readout signal for the corresponding machine counter occurs. Thus, the readout or transfer of total or part count can be performed automatically by a stored control bit.

When the machine starts to score Part II, for example, which is assumed to have four response positions for each question, switch 201B in FIG. 3*d* controls the generation of P-ring signals for sensing response bits and storing master data bits. This switch, when energized, applies one signal on lines 230, 231 to Inverter 232 which inhibits the generation of HP5 and HP10 signals at P5 and P10 times respectively. Instead, these P-ring signals are supplied through section A of switch 201 to condition AND 212 so that P5 and P10 signals serve as EOQ signals. The inhibition of certain P-ring signals for test parts having other numbers of response positions per question are similarly controlled by switches 200–202.

The scoring of a response document continues, in the manner described, for the various parts until the trailing edge of the document operates the paper levers 21, 22 and 23 (FIG. 3*b*) as described above. The stored master data continues to circulate and the "word mark" is removed from the delay line. The feeding of a new response document then starts a repetition of the scoring process described. Any number of response documents may be scored against the stored master and control data without loss or deterioration of the stored data.

In FIG. 1, there are shown words of response positions 300 designated "Student Number." These response positions are optional and may be used to record a serial number of one mark per word for subsequent identification of a record punched from the data on the response document. The circuit for recording the Student Number is shown in FIG. 3*b*, and comprises AND 301 which turns on Student Number latch 302 when activated by switch 303 in conjunction with a reset signal at the start of each document from AND 65. Switch 303 is moved to its on terminal when response documents are to be scored. The signal from latch 302 conditions AND 304 which is activated to provide an output signal each time a mark signal appears from OR 97. After the control data has been stored on the delay line, switch 95 is returned to terminal 95*a* so that the mark signals from AND circuits 91–1 through 91–10 are available from OR 97. The output signals from AND 304 are supplied through switch 305 to a suitable data storage device for a punch mechanism. Switch 305 may be ganged with switch 303 or with switch 28A (FIG. 3*c*) so that switch 305 is closed when switch 28A is off at terminal 100*b*.

Latch 302 is turned off by an output signal from AND 306 which is activated by the coincidence of an R12 signal and an EOP signal from AND 288 (FIG. 3*c*) which is generated in response to a stored EOP bit on the delay line at RB time. The EOP bit for the Student Number is stored at the time other control data are stored. This EOP signal is not used, however, to advance the parts counter triggers 203 and 204. The Student Number is not considered a test part and while latch 302 is on, its output signal is applied to Inverter 307 (FIG. 3*d*) which blocks AND circuits 210 and 208 until latch 302 is turned off. When latch 302 is turned off, AND 208 is conditioned to provide its Part I signal while AND 210 can be activated by the next EOP and R11 signals.

The scoring counters and control circuits for counter readout and transfer have not been shown and form no part of the invention herein disclosed. It is evident that the scoring results and response mark location can be supplied to printing and punching mechanisms for recordation. These mechanisms also have not been described since they form no part of the invention.

While the invention has been particularly shown and described with reference to a preferred embodiment thereof, it will be understood by those skilled in the art that various changes in form and details may be made therein without departing from the spirit and scope of the invention.

What is claimed is:

1. In a machine for scoring response data against master data in which said data are represented by marks in selected ones of mark positions arranged in groups on a document having a timing mark thereon for each said group, apparatus for storing said master data comprising:

- first scanning means for sensing said timing marks and providing a control signal in response to each said mark;
- second scanning means responsive to said control signal for sensing the mark positions in a group and temporarily storing signals representative of the marks sensed therein;
- means for moving said document past said first and second scanning means;
- delay line storage means including pulse regeneration means for storing therein a plurality of information bit pulses and continuously recirculating said bit pulses; and
- control means responsive to each said control signal for transferring said temporarily stored mark signals from said second scanning means to predetermined positions of storage in said delay line storage means as information bit pulses.

2. In a machine for scoring response data against master data in which the data are represented by marks in selected ones of mark positions arranged in groups on a document having a timing mark for each said group, apparatus for transferring said master data from a document to storage comprising:

- first scanning means for sensing said timing marks and providing a control signal in response to each said timing mark;

second scanning means activated by each said control signal for simultaneously scanning the mark positions of a group and temporarily storing a data bit signal indicative of each said mark in the group;

means for transporting the document with said master data thereon past said first and second scanning means in operative association therewith;

delay line storage means including pulse regeneration means for continuously recirculating in predetermined sequence as bit pulses the data bit signals transferred thereto; and control means responsive to said control signal after a predetermined time delay for serially transferring said stored data bit signals from said second scanning means as bit pulses to predetermined storage positions in said delay line storage means.

3. In a machine for comparing marks in selected positions on a master document with marks in selected positions on a response document, apparatus for storing as information bits positions marked on said master document comprising:

means including transducers operable for scanning the marks on said master document to provide a mark signal for each mark in predetermined groups of said mark positions;

buffer means responsive to said mark signals for temporarily storing said mark signals of each said group;

delay line storage means for storing the signals of all of said groups sequentially therein as information pulses, including means for regenerating information bits stored therein;

cyclic means for generating a series of timing pulses for each said group;

means for establishing a first marker pulse in said delay line means in conjunction with a first of said timing pulses indicating the start of the sequence of information pulses stored in said delay line;

means responsive to the coincidental occurrence of said first marker pulse and said first one of said timing pulses for establishing a second marker pulse in said delay line means following said first marker pulse;

control means responsive to the occurrence of said second marker pulse and said others of said timing pulses for serially gating said stored signals into said delay line as information pulses; and means responsive to the coincidence of said second marker pulse and said first one of said timing pulses in one cycle of said generating means for blocking said regeneration of said second marker pulse until the recurrence of said first one of said timing pulses in a succeeding cycle of said generating means.

4. In a machine for scoring response data against master data in which the master data are represented by marks in selected ones of mark positions arranged in groups on a document having a timing mark for each said group, apparatus for storing the data on said master document comprising:

first scanning means for sensing said timing marks and providing a control signal in response to each said timing mark;

second scanning means activated by each said control signal for simultaneously scanning the mark positions of a said group and temporarily storing a distinct output data signal indicative of each mark sensed in said group;

transport means for moving said document in operable relationship with said first and second scanning means;

delay line storage means for storing therein marker pulses and data pulses representative of mark data, said delay line means including means for regenerating and recirculating pulses stored therein;

cyclic timing means for repetitively generating a predetermined series of timing pulses;

means responsive to one of said timing pulses for storing a first marker pulse on said delay line;

means responsive to the leading edge of said document and said first marker pulse for storing a second marker pulse on said delay line;

first control means responsive to a said control signal after a predetermined time delay and said second marker pulse for inhibiting the regeneration of said second marker pulse and transferring said data output signals serially from said second scanning means to said delay line in predetermined timed relation with the other of said timing pulses; and second control means operable in respone to the recurrence of said one of said timing pulses from said timing means for reinserting said second marker pulse in said delay line following said transfer of said data output signals of a said group of mark positions to said delay line.

5. In a machine for scoring response data against master data in which the master data are represented by marks in selected ones of mark positions arranged in groups on a master document having a timing mark corresponding to each said group, apparatus for storing said master data comprising:

first scanning means for providing a control signal in response to each timing mark scanned on said master document;

second scanning means operable in response to said control signal for simultaneously scanning the mark positions of a said group and temporarily storing an output data signal for each said mark scanned in said group;

means for transporting said document past said first and second scanning means in operative relation therewith;

delay line storage means adapted to store a marker pulse and said output data signals as information bits therein, said delay line means including means for continuously regenerating and recirculating the stored information bits;

cyclic means for repetitively generating a predetermined series of timing pulses;

means responsive to one of said timing pulses in said series for storing a marker pulse on said delay line storage means;

control means responsive to each said control signal for storing the data signals from said mark position groups at said second scanning means in said delay line means coincident with others of said timing signals, with each signal group bearing a position relative to said marker pulse according to the group location on said document.

6. In a machine for scoring response data against master data in which the data is represented by marks in selected one of each of a plurality groups of mark positions on a document with said document having a timing mark corresponding to each said group, master data storage apparatus comprising:

first sensing means including a plurality of transducers each arranged to sense a predetermined mark position in each said group and adapted to produce an output mark signal upon sensing a mark;

second sensing means adapted to sense said timing marks and provide a control signal for each said mark;

buffer storage means associated with each of said transducers for temporarily storing said mark signals occuring in each said group;

delay line storage means for storing the mark signals of all of said groups therein, including means for recirculating said mark signals through said delay line;

means for feeding said document past said first and second sensing means;

cyclic means for repetitively generating a series of timing pulses for each said group of mark positions;

means responsive to the leading edge of said document and one of said timing pulses for establishing a first marker pulse in said delay line storage means;

means operated by said control signal and said one of said timing pulses for entering a second marker pulse on said delay line;

means operated by said control signal and the remaining ones of said timing signals for transferring said mark signals serially from said buffer storage means to said delay line storage means at a time designated by the occurrence of said second marker pulse; and means responsive to the occurrence of said second marker during said control signal for entering said second marker pulse a predetermined time later on said delay line.

7. In a machine for scoring selectively marked master and response documents for questions in which groups of response positions are provided for each question on said response and master documents and said groups of response positions are arranged in rows on said documents, apparatus comprising, in combination:

a plurality of transducer means arranged to scan each response position of a multiplicity of said groups simultaneously with each said transducer means providing an output signal for each mark sensed in said response position scanned;

transport means for moving said master and response documents successively past said transducers;

temporary storage means for each said transducer means for storing said output signals provided by said transducer means;

means for concurrently gating each of said temporary storage means to receive a signal from the corresponding one of said transducer means;

delay line means for providing continuing, recirculating storage for said temporarily stored signals;

first control means operable for serially transferring said signals obtained from said master document from said temporary storage means to said delay line means;

readout storage means for said delay line storage means;

second control means operable upon scanning said response documents for transferring selected ones of said signals stored in said delay line means to said readout storage means; and comparing means responsive to said second control means for comparing the signals in said readout storage means with the signals in said temporary storage means.

8. In a machine for scoring a response document against a master document each having corresponding rows of groups of mark positions thereon in which selected ones of said positions have marks therein, apparatus comprising, in combination:

first and second pluralities of transducer means arranged to sense predetermined ones of said mark positions in each said row with each said transducer means being operable to provide an output signal upon sensing a said mark;

first and second pluralities of temporary storage means corresponding to said pluralities of transducer means with each said transducer means being connected to an associated one of said temporary storage means for storing said signals from each said transducer plurality as a group;

means connected to said temporary storage means for successively gating said first and second pluralities of temporary storage means to receive said signals concurrently in each said plurality;

delay line means for providing continuously recirculating storage of said temporarily stored signals;

first control means operable in one state during the sensing of said master document for serially transferring the signals from said first and second pluralities of said temporary storage means as words of data bits to said delay line storage means, and operable in another state during the sensing of said response document for blocking said transfer of said temporarily stored signals;

a plurality of readout storage means for said delay line means for successively storing words of data bits corresponding to the output signals in said first and second pluralities of said temporary storage means during the scanning of said response document;

second control means for transferring said words of data bits successively to said readout storage means; and means for comparing said bits in each data word in said readout storage means successively with said signal groups in said temporary storage means during the scanning of said response documents.

9. In a machine for scoring data on a response document against data on a master document with said documents each having corresponding selectively markable rows of areas in which each mark in a said area is an information bit and a predetermined number of said areas in each said row compose a data word, apparatus comprising, in combination:

a plurality of transducer means for each said data word in a row with each said transducer means in said plurality arranged to simultaneously sense a predetermined one of said areas and provide an output bit signal upon sensing a said mark;

buffer storage means for each said transducer means in a said plurality for storing said bit signals;

means connected to said buffer storage means for concurrently gating the bit signals in said word from a said transducer plurality to the corresponding said buffer storage means;

delay line means for providing continuously recirculating storage for said bit signals in a word by word relation;

first control means operable in a first state during the sensing of said master document for serially transferring said bits from said buffer storage means to said delay line means, and operable in a second state during sensing of said response documents for blocking said bit signal transfer from said buffer storage means;

readout storage means for said delay line means adapted to store the bits of a said word;

second control means operable when said first control means is in said second state for transferring the bits of a predetermined word from said delay line means to said readout storage means; and means connected between said buffer storage means and said readout storage means for comparing the data words stored in both said storage means bit by bit.

10. In a machine for scoring master data against response data in which the data are represented by marks in selected ones of mark positions arranged in groups on master and response documents each having a timing mark corresponding to each said group thereon, apparatus comprising:

first scanning means for providing a control signal in response to each timing mark sensed on said master and response documents;

second scanning means operable in response to a said control signal for scanning the mark positions of a group simultaneously and temporarily storing an output data signal for each mark in a said group on said master and response documents;

means for transporting said master and response documents successively past said first and second scanning means in operative association therewith;

delay line storage means for storing as a word of data bits, the output data signals provided in response to each group of said scanned mark positions on said master document; said delay line storage means having means for continuously regenerating and recirculating the bits in each said data word;

first control means operable in response to each said control signal for transferring the stored output signals of each said mark position group in said second scanning means to said delay line means as a data word positioned in said delay line means in relation to the position said group occupies on said master document;

readout storage means for storing therein a word of data bits from said delay line storage means;

second control means operable in response to each said control signal for transferring the bits of a data word from a predetermined location said delay line means to said readout storage means;

means operable in one state for inhibiting the operation of said second control means and operable in a second state for inhibiting the operation of said first control means; and means effective when said inhibiting means is in said second state for comparting the data bits in said readout means with the data signals from said second scanning means for each occurrence of a said control signal.

11. In a machine for scoring master data against response data in which the data are represented by marks in selected ones of mark positions arranged in groups and subgroups on master and response documents each having a timing mark corresponding to each said group thereon, apparatus comprising:

first sensing means for providing a control signal in response to each timing mark sensed on a said document;

second sensing means operable in response to a said control signal for simultaneously sensing the mark positions in said corresponding group and temporarily storing an output data signal for each mark in a said group on said documents;

means for transporting said master and response documents successively past said first and second sensing means in operative association therewith;

delay line storage means for storing therein the data signals for each said group of mark positions on a document as bits in a data word, said delay line storage means having means for continuously regenerating and recirculating each data word;

first control means operable in response to a said control signal for serially transferring said temporarily stored data signals for a said group to said delay line storage means;

readout storage means for storing therein the bits of a said data word from said delay line storage means;

second control means operable in response to a said control signal for transferring the bits of a data word from a predetermined location in said delay line means to said readout storage means;

selective means operable in one state for inhibiting said second control means and operable in a second state for inhibiting the operation of said first control means;

means operable when said inhibiting means is in said second state for serially comparing the bits in a said data word with the data signals stored in said second sensing means for each occurrence of a said control signal and indicating comparison and noncomparison of said data bits and data signals; and presettable means for resetting said comparing means at the end of comparison of each said subgroup of mark positions in a said group.

12. In a machine for scoring master data against response data in which the data are represented by marks in selected ones of mark positions arranged in groups on master and response documents each having a timing mark corresponding to a predetermined number of groups thereon, apparatus comprising, in combination:

first sensing means for providing a control signal in response to each timing mark sensed on a said document;

second sensing means operable in response to a said control signal for simultaneously sensing the mark positions of a predetermined number of groups corresponding thereto and temporarily storing an output data signal for each mark position sensed;

means for transporting said master and response documents past said first and second sensing means in operative association therewith;

delay line storage means for storing therein the data signals for each said predetermined group plurality as bits in a data word; said delay line means including means for continuously regenerating and recirculating said data word;

first control means operable in response to a said control signal for transferring from said second sensing means the temporarily stored data signals of a said predetermined group plurality to said delay line storage means;

readout storage means for storing therein the bits of said data from said delay line means;

second control means operable in response to a said control signal for transferring the data bits of a said word to said readout storage means;

selection means for rendering said first control means effective when a said master document is sensed and for rendering said second control means effective when said response document is sensed;

comparing means operable when said second control means is effective for serially comparing the data bits of a word in said readout means with the data signals from said second sensing means to indicate coincident and noncoincident presence of said data bits and signals; and preselectable means for resetting said comparing means after the comparison of each said group.

References Cited by the Examiner

UNITED STATES PATENTS

| | | | |
|---|---|---|---|
| 2,944,734 | 7/1960 | Martin | 235—61.7 |
| 3,050,248 | 8/1962 | Lindquist | 235—61.7 |

MAYNARD R. WILBUR, *Primary Examiner.*

DARYL W. COOK, *Assistant Examiner.*